(12) United States Patent
Takahara et al.

(10) Patent No.: US 10,178,829 B2
(45) Date of Patent: Jan. 15, 2019

(54) COMBINE AND GRAIN EVALUATION CONTROL APPARATUS FOR COMBINE

(71) Applicant: Kubota Corporation, Osaka-shi (JP)

(72) Inventors: Kazuhiro Takahara, Sakai (JP); Mao Ueda, Sakai (JP)

(73) Assignee: Kubota Corporation, Osaka (JP)

( * ) Notice: Subject to any disclaimer, the term of this patent is extended or adjusted under 35 U.S.C. 154(b) by 0 days.

(21) Appl. No.: 15/532,686

(22) PCT Filed: Dec. 25, 2015

(86) PCT No.: PCT/JP2015/086351
§ 371 (c)(1),
(2) Date: Jun. 2, 2017

(87) PCT Pub. No.: WO2016/147521
PCT Pub. Date: Sep. 22, 2016

(65) Prior Publication Data
US 2018/0177125 A1 Jun. 28, 2018

(30) Foreign Application Priority Data

Mar. 18, 2015 (JP) .................. 2015-055136
Mar. 18, 2015 (JP) .................. 2015-055137

(51) Int. Cl.
*A01D 41/127* (2006.01)
*A01B 79/00* (2006.01)
(Continued)

(52) U.S. Cl.
CPC .......... *A01D 41/127* (2013.01); *A01B 79/005* (2013.01); *A01D 41/1208* (2013.01); *A01D 41/1277* (2013.01); *A01F 12/46* (2013.01)

(58) Field of Classification Search
CPC ..... A01B 69/00; A01B 69/004; A01B 79/005; A01C 21/00; A01C 21/005; A01D 41/141;
(Continued)

(56) References Cited

U.S. PATENT DOCUMENTS 5,666,793 A * 9/1997 Bottinger ............. A01B 79/005
460/1
6,167,337 A * 12/2000 Haack ....................... E02F 9/26
222/63
(Continued)

FOREIGN PATENT DOCUMENTS

JP 200681488 A 3/2006
JP 2014187945 A 10/2014
(Continued)

*Primary Examiner* — Robert E Pezzuto
(74) *Attorney, Agent, or Firm* — The Webb Law Firm

(57) ABSTRACT

A combine for reaping culms in a field while traveling, and accumulating, in a grain tank 2, grains obtained by threshing reaped culms, includes: a yield calculator for calculating a yield per unit of travel, which is a yield per unit of travel distance; a work travel determiner 53 for determining non-harvest work travel that does not involve grain harvesting, and harvest work travel that involves grain harvesting; a harvest map data generator 66 for generating harvest map data in which the yield per unit of travel, a travel route on which the combine has traveled in a field, and a result of determination performed by the work travel determiner are associated with one another; and a harvest information recorder for recording the harvest map data.

28 Claims, 22 Drawing Sheets

(51) Int. Cl.
*A01F 12/46* (2006.01)
*A01D 41/12* (2006.01)

(58) Field of Classification Search
CPC ............. A01D 41/1208; A01D 41/127; A01D 41/1277; A01D 41/1274; A01D 41/1276; A01D 41/1243; A01D 45/10; A01F 12/46
USPC .... 56/10.2 A–10.2 H, 10.2 R; 460/1–7, 149; 172/2–11; 701/1, 24, 29.6, 32, 99, 106, 701/108, 111
See application file for complete search history.

(56) References Cited

U.S. PATENT DOCUMENTS

| | | | |
|---|---|---|---|
| 6,343,238 B1* | 1/2002 | Kudo | G06Q 10/06 700/106 |
| 8,463,510 B2* | 6/2013 | Knapp | A01B 79/005 701/50 |
| 9,615,501 B2* | 4/2017 | Pickett | A01D 41/141 |
| 9,901,031 B2* | 2/2018 | Mott | A01D 41/1274 |
| 9,934,538 B2* | 4/2018 | Hunt | A01D 41/127 |
| 9,986,677 B2* | 6/2018 | Valberg | A01B 79/005 |
| 2015/0243114 A1 | 8/2015 | Tanabe et al. | |
| 2016/0029559 A1 | 2/2016 | Inoue et al. | |
| 2016/0066507 A1 | 3/2016 | Inoue et al. | |

FOREIGN PATENT DOCUMENTS

| | | |
|---|---|---|
| JP | 2014212749 A | 11/2014 |
| WO | 2014050525 A1 | 4/2014 |
| WO | 2014174869 A1 | 10/2014 |

* cited by examiner

Fig.2
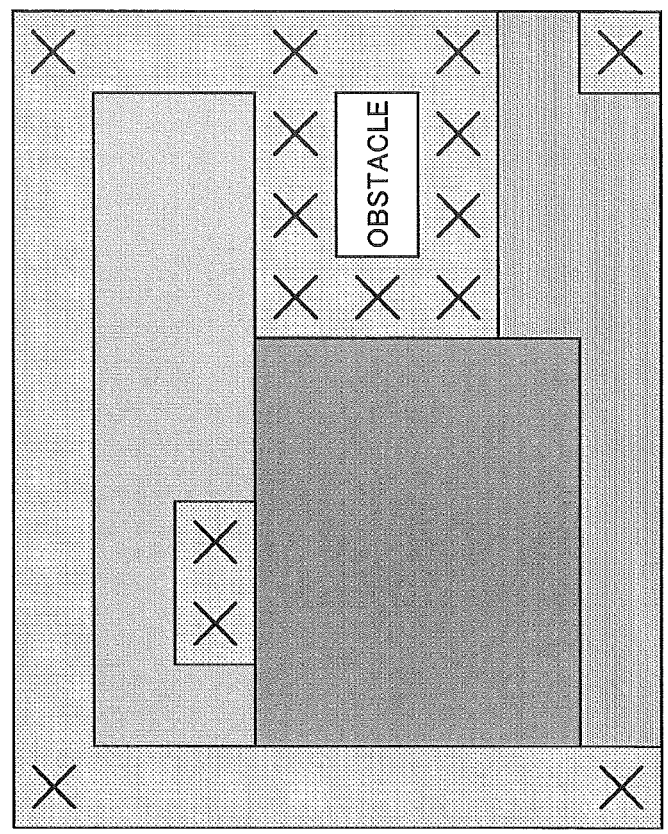
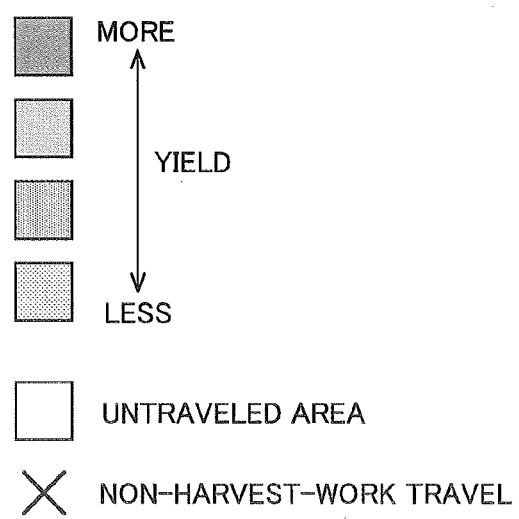
MORE
↑
YIELD
↓
LESS
UNTRAVELED AREA
✕ NON-HARVEST-WORK TRAVEL

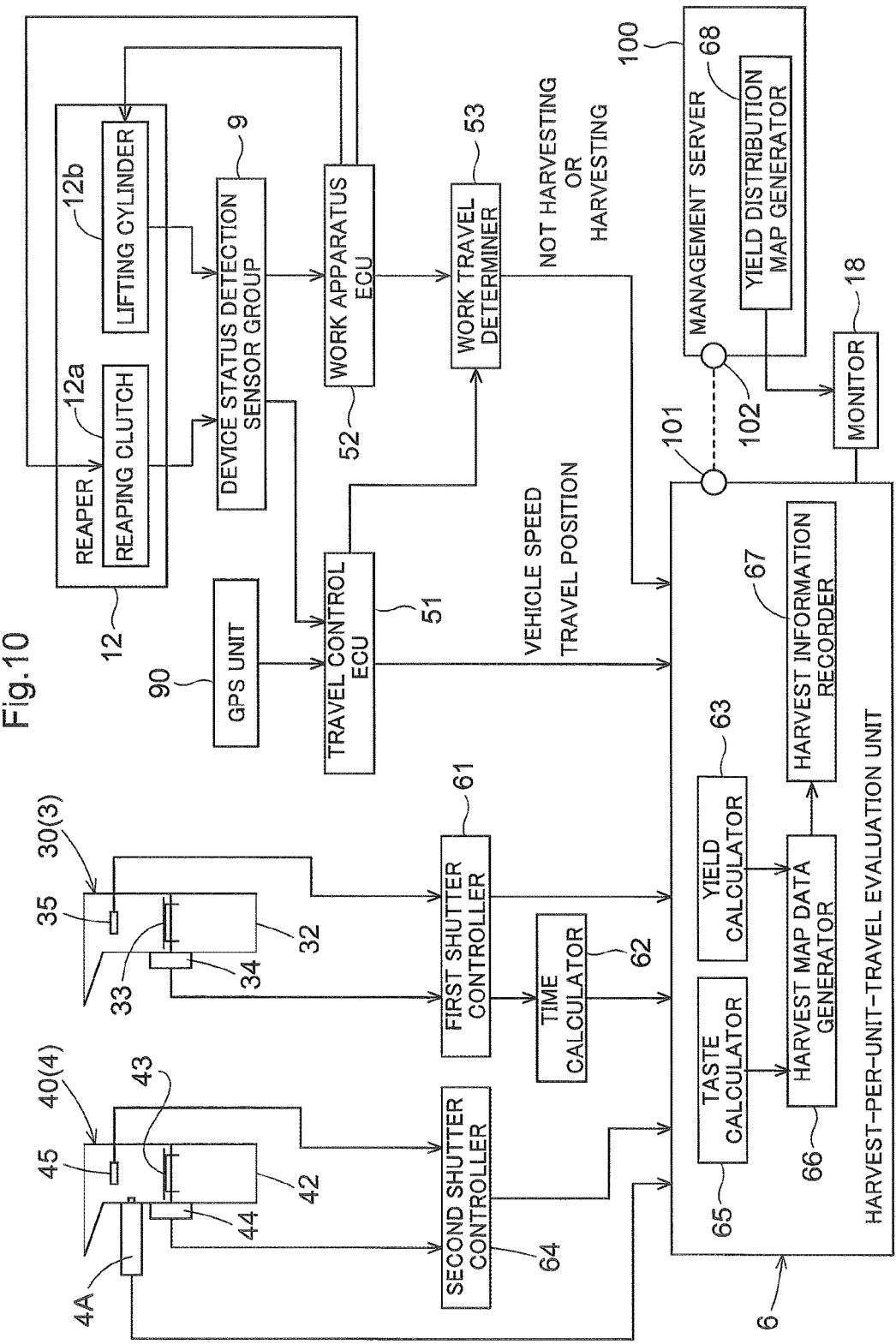

Fig.13
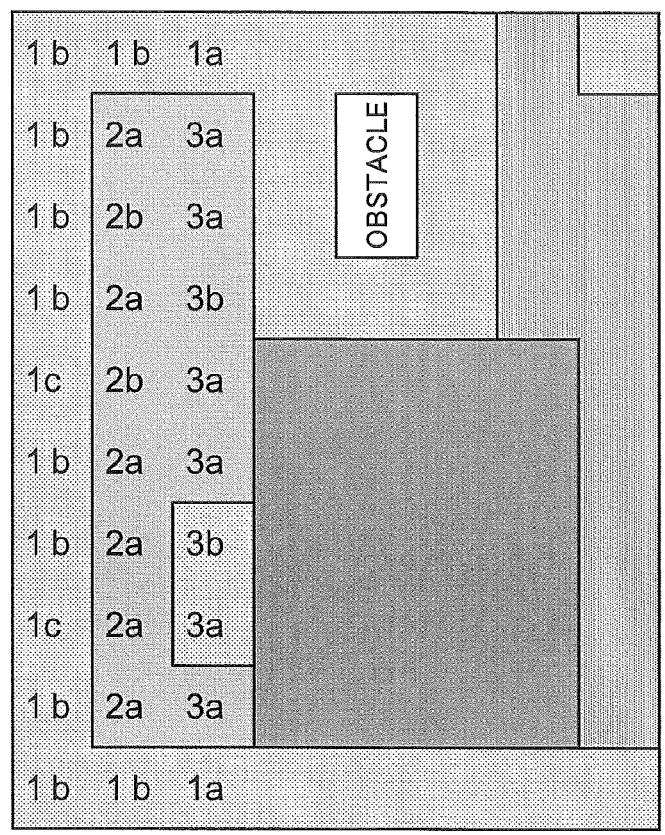
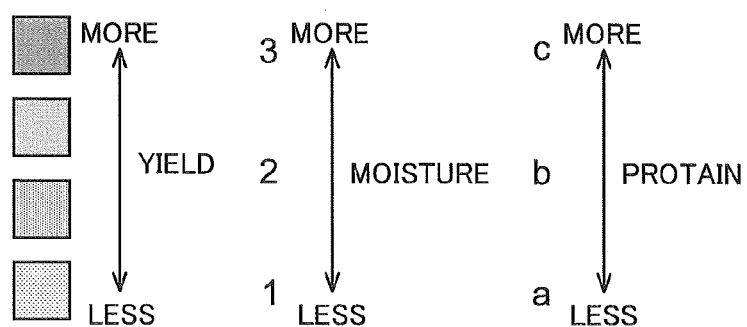

COMBINE AND GRAIN EVALUATION CONTROL APPARATUS FOR COMBINE

CROSS-REFERENCE TO RELATED APPLICATIONS

This application is the United States national phase of International Application No. PCT/JP2015/086351 filed Dec. 25, 2015, and claims priority to Japanese Patent Application Nos. 2015-055136 and 2016-055137, both filed Mar. 18, 2015, the disclosures of which are hereby incorporated in their entirety by reference.

TECHNICAL FIELD

The present invention relates to combines for reaping culms in a field while traveling, and accumulating, in a grain tank, grains obtained by threshing reaped culms, and to grain evaluation control apparatuses for combines.

BACKGROUND ART

[1] Combines have been proposed that measure the weight and moisture of grains contained in a grain tank and output the measurement result as harvest information regarding the harvested grains. For example, the combine described in Patent Document 1 includes a moisture measurement apparatus for taking in some of the grains supplied to the grain tank and measuring the moisture content thereof, and a load cell for detecting a load applied to the grain tank. During traveling for harvest, harvested grains (yield) per reaping area can be calculated based on an increase in the grain tank. However, it is difficult to accurately calculate the yield in a relatively small reaping area based on a change in the load on the grain tank, because the increased weight of the grains is small compared with the weight of the grain tank itself, and a measurement error is likely to occur due to the grains being on one side in the grain tank, for example.

To more accurately calculate the yield, the combine described in Patent Document 2 includes: a yield measurement container having a yield receiving opening for receiving grains supplied to a grain tank, a yield discharge opening for discharging received grains, and a yield shutter for opening and closing the yield discharge opening; a time calculator for calculating an accumulation time required for a given volume of grain to accumulate in a yield measurement container; and a yield calculator for calculating a yield per unit of travel (yield per unit of reaping area) based on travel speed and accumulation time. By statistically processing the yield per unit of travel that is sequentially calculated by the yield calculator, a yield distribution for an entire field can also be created.

In the advanced, computer-assisted field management, the yield distribution per minute parcel of a field is important data. However, when a combine travels for harvest work, non-harvest work travel that does not involve harvest work occurs during traveling while turning and traveling around obstruction. Despite this, the aforementioned conventional combines obtain the yield per unit of travel without distinguishing between harvest work travel and non-harvest work travel. For this reason, the yield distribution for an entire field may be incorrect.

[2] Combines have been proposed that simultaneously measure the weight (yield) and moisture (taste) of grains contained in a grain tank to evaluate harvested grains. For example, the combine described in Patent Document 2 includes: a yield calculation apparatus for calculating a yield of harvested grain per unit of travel; and a taste calculation apparatus for calculating the taste of the harvested grains. The yield calculation apparatus has: a yield measurement container having a yield receiving opening for receiving grains supplied to a grain tank, a yield discharge opening for discharging received grains, and a yield shutter for opening and closing the yield discharge opening; a time calculator for calculating an accumulation time required for a given volume of grain to accumulate in a yield measurement container; and a yield calculator for calculating a yield per unit of travel (yield per unit of reaping area) based on a travel speed and the accumulation time. The taste calculation apparatus has: a taste measurement container having a taste receiving opening for receiving grains discharged from the yield discharge opening, a taste discharge opening for discharging the received grains, and a taste shutter for opening and closing the taste discharge opening; and a taste measurer for measuring a taste of grains accumulated in the taste measurement container. With this configuration, it is possible to evaluate, at any time, a distribution of the yield and taste in a field by acquiring, as a harvest-time grain measurement data set, the yield and taste value of grains harvested in a specific parcel of a field, and recording this data set.

PRIOR ART DOCUMENTS

Patent Documents

Patent Document 1: JP 2006-081488A
Patent Document 2: JP 2014-212749A

DISCLOSURE OF THE INVENTION

Problem to be Solved by the Invention

[1] A problem concerning the background art [1] is as follows.

In view of the foregoing situation, there is a need for a harvest-time yield calculation technique to obtain a more accurate yield distribution for an entire field.

[2] A problem concerning the background art [2] is as follows.

In optical taste measurement such as one used in the combine in Patent Document 2, grains subjected to the measurement need to stay in a stationary state for a fixed time. Since this fixed time is several times longer than the time required for single yield measurement, a grain volume that is several times the grain volume used in single yield measurement is required for a taste measurement container.

Due to the foregoing situation, there is a need for measures to be taken to avoid a difference between the time required for yield measurement and the time required for taste measurement adversely affecting the respective measurements when yield measurement and taste measurement are simultaneously performed on harvested grains to acquire, as a grain data set, the yield and taste value of the grains harvested in a specific parcel of a field.

Means for Solving Problem

[1] A solving means corresponding to the problem [1] is as follows.

A combine according to the present invention for reaping culms in a field while traveling, and accumulating, in a grain tank, grains obtained by threshing reaped culms, includes a yield calculator for calculating a yield per unit of travel, which is a yield per unit of travel distance; a work travel determiner for determining non-harvest work travel that does not involve grain harvesting, and harvest work travel that involves grain harvesting; a harvest map data generator for generating harvest map data in which the yield per unit of travel, a travel route traveled in the field, and a result of determination performed by the work travel determiner are associated with one another; and a harvest information recorder for recording the harvest map data.

With this configuration, the yield per unit of travel distance (yield per unit of travel) calculated by the yield calculator is associated with harvest work travel or non-harvest work travel that is determined by the work travel determiner. Accordingly, it is possible to assign attribute information indicating harvest work travel or non-harvest work travel to the yield per unit of travel in the harvest map data, which is a set of yields per unit of travel for an entire field. When creating a yield distribution for an entire field using the harvest map data, it is possible to distinguish between harvest work travel and non-harvest work travel to eliminate the non-harvest work travel. The yield per unit of travel during non-harvest work travel can also be estimated using an interpolation method or the like. Thus, it is possible to obtain a yield distribution for an entire field that is based on actual harvest work travel, more accurate, and is suitable for computer-based field management in units of minute parcels.

While actual harvest work is performed in the field, checking of the status of the yield per unit of travel for the field is also important in terms of the acquisition of knowledge regarding farm work. When considering operational efficiency, it is also important for an operator of the combine to check harvest work travel and non-harvest work travel that have actually been performed. For this reason, according to a preferable embodiment of the present invention, a yield distribution map, which indicates a distribution of the yield per unit of travel distance in a field subjected to work, is generated based on the yield map data. A monitor for displaying this yield distribution map is provided. This monitor may be a fixed display device attached to the combine, or may be a display on a mobile terminal that can be attached to the combine or carried by the operator.

A yield distribution map for a single field can be generated based on a set of yields per unit of travel that are combined along a travel trajectory of the combine. In this regard, it is possible to easily distinguish between a decrease in the yield due to non-harvest work travel and a decrease in the yield due to a farm work-related cause, by distinguishing between a trajectory portion of non-harvest work travel and a trajectory portion of harvest work travel. For this reason, it is preferable that a travel route during the non-harvest work travel is displayed in a distinguishable manner in the yield distribution map.

To create the yield distribution map based on the harvest map data, statistical computation and processing to visualize the computation result are required. It is also important to accumulate the yield distribution map generated based on the harvest map data in order to visualize agricultural administration and to make efficient farm work plans. Furthermore, it is better for farms that manage many fields to integrally manage the harvest map data or the yield distribution map of each field. For such integral centralized management in agricultural administration, it is convenient to handle the harvest map data and the yield distribution map on a management server that is installed outside the combine, rather than installed in the combine. Accordingly, according to a preferable embodiment of the present invention, a transmitter for transmitting the harvest map data to an external management server via a communication line, and a receiver for receiving the yield distribution map generated by the management server based on the harvest map data are provided. Of course, the processing capability of information terminal devices or the like has improved in recent years. For this reason, in the case where such an information terminal device is mounted on the combine, it is also possible to provide the combine itself with a yield distribution map generation unit for generating the yield distribution map based on the harvest map data.

Combines travel to harvest crops, but do not always travel at a fixed speed. In common combines, the vehicle speed is constantly checked. For this reason, in a preferable embodiment for calculating the yield per unit of travel, i.e. the yield per unit of travel distance, the yield calculator calculates the yield per unit of travel based on the vehicle speed and the accumulation time required for a given volume of grain to accumulate. For example, the accumulation time taken for grains supplied from the threshing apparatus to the grain tank to reach a given volume is measured. The yield per unit of travel is obtained by dividing the given volume by a travel distance, which is obtained by multiplying this accumulation time by the vehicle speed (to be exact, the average vehicle speed during this accumulation time).

Combines cannot perform a reaping operation if a reaper for reaping culms in a field has been raised from the ground. For this reason, to determine non-harvest work travel, it need only be checked that the height of the reaper from the ground is a given height or more. For this reason, according to a preferable embodiment of the present invention, the work travel determiner determines non-harvest work travel and harvest work travel based on the height of the reaper for reaping culms in a field from the ground. Also, harvest work cannot be performed if power is not transmitted to the reaper. For this reason, according to a preferable embodiment of the present invention, the work travel determiner determines non-harvest work travel and harvest work travel based on switch-off information regarding a reaping clutch for switching on and off power transmission to the reaper for reaping culms in a field. That is to say, if the combine is traveling with the reaping clutch switched off, it is determined that non-harvest work travel is being performed. Conversely, if the combine is traveling with the reaping clutch switched on, it is determined that harvest work travel is being performed.

Important information to be managed regarding harvested grains such as rice and wheat includes not only the yield but a taste value regarding moisture, protein, or the like. If this taste value can be measured for every unit travel distance, i.e. every minute parcel of a field, the influence of sunlight, the state of fertilization, or the like on the taste value can be evaluated, and fields can be managed in a refined manner. To achieve measurement of such a taste value, or so-called taste measurement, for every minute parcel with a possible simple configuration, according to a preferable embodiment of the present invention, a taste measurement container for temporarily accumulating at least some of the grains supplied to the grain tank, a taste measurer for outputting a measured value related to a taste of the grains accumulated in the taste measurement container, and a taste calculator for calculating a taste value per unit of travel distance based on the measured value are provided. The harvest map data generator incorporates the taste value into the harvest map data.

As a specific configuration of a yield measurement apparatus to be used for calculating the yield per unit of travel using the yield calculator, the present invention proposes providing a yield measurement container for temporarily accumulating at least some of the grains supplied to the grain tank. In this case, the yield calculator calculates the yield per unit of travel based on the state of grains accumulated in the yield measurement container. In the case where a grain conveyance path between the threshing apparatus and the grain tank or a yield receiving opening of the yield measurement container for temporarily accumulating the grains in the grain tank can receive only some of the grains supplied to the grain tank, if only the ratio of the receiving amount to the entire amount of supply is known in advance, the actual yield per unit of travel can be obtained. Thus, the grain accumulation capacity of the yield measurement container can be reduced, and the structure thereof is accordingly made more compact.

[2] A solving means corresponding to the problem [2] is as follows.

A combine according to the present invention for reaping culms in a field while traveling, and accumulating, in a grain tank, grains obtained by threshing reaped culms, includes: a yield measurement container; a yield calculator; a taste measurement container; and a taste calculator. The yield measurement container has a first receiving opening for receiving at least some of the grains supplied to the grain tank, a first discharge opening for discharging received grains, and a first shutter for opening and closing the first discharge opening to enable grains received through the first receiving opening to temporarily accumulate. The yield calculator calculates a yield per unit of travel, which is a yield per unit of travel distance, based on the state of grains accumulated in the yield measurement container. The taste measurement container has a second receiving opening for receiving at least some of the grains supplied to the grain tank, a second discharge opening for discharging received grains, and a second shutter for opening and closing the second discharge opening to enable grains received through the second receiving opening to temporarily accumulate. The taste calculator measures a taste value of grains temporarily accumulated in the taste measurement container, and calculates a taste value per unit of travel, which is a taste value of grains harvested per unit of travel distance.

In this configuration, the yield measurement container and the taste measurement container are provided independently of each other, and receive at least some of the grains supplied to the grain tank through respective receiving openings. Thus, in yield measurement and taste measurement, appropriate amounts of grains for the respective measurements can accumulate in the containers, and optimal measurements can be performed.

As a preferable embodiment for distributing at least some of the grains supplied from the threshing apparatus to the grain tank to the yield measurement container and the taste measurement container, the present invention proposes a configuration in which a first opening and a second opening are formed in an intra-grain-tank pipe portion of a supply pipe for supplying grains from a threshing apparatus to the grain tank, the first opening and the second opening being open spaced apart in a grain supply direction, the first opening is the first receiving opening, and the second opening is the second receiving opening. In this configuration, the grains are distributed and supplied to the yield measurement container and the taste measurement container by only forming two openings in the supply pipe for supplying grains to the grain tank, which is favorable in terms of manufacturing costs. Furthermore, in this regard, if the first opening is formed at a position closer in a grain supply direction to the threshing apparatus than the second opening, some of the grains that flow in from the threshing apparatus through the supply pipe are first discharged into the yield measurement container through the first opening, and some of the grains that flow in through the first opening are discharged into the taste measurement container through the second opening. Since the first opening is located on the upstream side in a grain flow direction relative to the second opening, the amount of grain discharged from the first opening is not affected by the second opening. Accordingly, by appropriately selecting the size of the first opening, a given percentage of the amount of grain supplied from the threshing apparatus to the grain tank is supplied to the yield measurement container. Since taste measurement can be accurately performed as long as a given amount of grain or more is accumulated in the taste measurement container, a slight change in the amount of grain discharged from the second opening by the first opening does not cause any problem. Accordingly, this configuration realizes independent and stable yield measurement and taste measurement.

In this case, if, as a preferable embodiment of the present invention, a configuration is employed in which the yield measurement container and the taste measurement container are arranged in the same wall face of the grain tank, it is also possible to partially use the same attachment structure for both the yield measurement container and the taste measurement container, which is convenient.

To supply grains from the threshing apparatus to the region of the first opening in a non-pulsating flow, according to a preferable embodiment of the present invention, a screw conveyer for supplying grains is provided in the intra-grain-tank pipe portion, and the screw conveyer is provided to extend up to the first opening from the threshing apparatus side. This configuration stabilizes the accuracy of yield measurement.

In taste measurement, grain components such as moisture and protein components are measured. For this reason, for accurate measurement, it is necessary to avoid entrance of anything other than grains (which are also called unhulled rice grains when in a threshed state) into the taste measurement container. For this purpose, according to a preferable embodiment of the present invention, the second opening is covered with a porous member for discriminating between foreign matter, such as straw, and unhulled rice grains. Thus, the entrance of straw or the like that flows in together with the grains (unhulled rice grains) from the threshing apparatus into the taste measurement container is avoided.

Provision of a discriminating member such as the porous member in the second opening may obstruct feeding of grains from the second opening to the taste measurement container. To avoid this, pressing grains into the second opening with external force is effective. For this purpose, a preferable embodiment of the present invention employs a configuration in which an impeller is provided in a portion that corresponds to the second opening in the intra-grain-tank pipe portion, the impeller being configured to rotate around a rotary axis along a direction in which the supply pipe extends, and unhulled rice grains are pressed by the impeller into the taste measurement container through the porous member.

The yield measurement container can temporarily accumulate a given amount of grain. For this reason, by repeating such temporary accumulation, the yield can be measured substantially continuously while the combine is traveling for reaping. Accordingly, the yield calculator can calculate the yield per unit of travel based on the vehicle speed and the accumulation time required for a given volume of grain to accumulate in the yield measurement container. In this case, the yield per unit of area can also be easily calculated by giving consideration to the reaping width. In a preferable embodiment, if a harvest map data generator for combining the yield per unit of travel and the taste value per unit of travel with a travel route traveled in a field to generate harvest map data, and a harvest information recorder for recording the harvest map data are provided, the yield and the taste value can be continuously assigned to the travel route of the combine. Thus, the harvested grains can be evaluated during harvest.

If the harvest map data in which the yield and the taste value are assigned to the travel route is available, it is possible to create a yield distribution map indicating a distribution of the yield in a field subjected to work, and also a taste distribution map indicating a distribution of the taste value in the field subjected to work, by allocating the yield and the taste value to each minute parcel of a field based on information regarding positions on the travel route in the field subjected to work. For this reason, according to a preferable embodiment of the present invention, a monitor is provided for displaying a yield distribution map indicating a distribution of the yield per unit of travel distance in a field subjected to work, the yield distribution map being generated based on the harvest map data.

To create the yield distribution map based on the harvest map data, it is preferable to use a simple statistical drawing algorithm. There are many kinds of yield distribution maps, and different statistical drawing algorithms are used therefor. For this reason, the yield distribution map generator may be mounted in each combine, but a configuration may also be employed in which a yield distribution map generator is built in an external management server such that many combines share the yield distribution map generator. Accordingly, according to a preferable embodiment of the present invention, a transmitter for transmitting the harvest map data to an external management server via a communication line and a receiver for receiving the yield distribution map generated by the management server based on the harvest map data are provided. According to another preferable embodiment of the present invention, a yield distribution map generator for generating the yield distribution map based on the harvest map data is provided.

The present invention is also applied to a grain evaluation control apparatus for a combine for reaping culms in a field while traveling, and accumulating, in a grain tank, grains obtained by threshing reaped culms. This grain evaluation control apparatus has a function of measuring and evaluating the yield and taste of grains during harvest. This grain evaluation control apparatus includes: a first shutter controller for controlling opening and closing of a first shutter for temporarily accumulating some of the grains supplied to the grain tank; a second shutter controller for controlling opening and closing of a second shutter for temporarily accumulating grains supplied to the grain tank other than the grains accumulated by the first shutter, independently of the control of the first shutter; a yield calculator for calculating a yield per unit of travel, which is a yield per unit of travel distance, based on a state of the grains temporarily accumulated by the first shutter; and a taste calculator for measuring a taste value of the grains temporarily accumulated by the second shutter, and calculating a taste value per unit of travel, which is a taste value of grains harvested per unit of travel distance. The grain evaluation control apparatus with this configuration can temporarily accumulate grains supplied to the grain tank during traveling for harvest in an independent manner using the first shutter and the second shutter that are independently controlled. For this reason, yield measurement and taste measurement are executed at respectively appropriate timings. Accordingly, measurement can be performed efficiently.

BRIEF DESCRIPTION OF THE DRAWINGS

FIG. 2 is a schematic diagram showing an example of a yield distribution map.

FIG. 10 is a functional block diagram showing a modification of the control system shown in FIG. 9.

FIG. 13 is a schematic diagram showing an example of a yield/taste distribution map.

BEST MODE FOR CARRYING OUT THE INVENTION

First Embodiment

Figure 1:
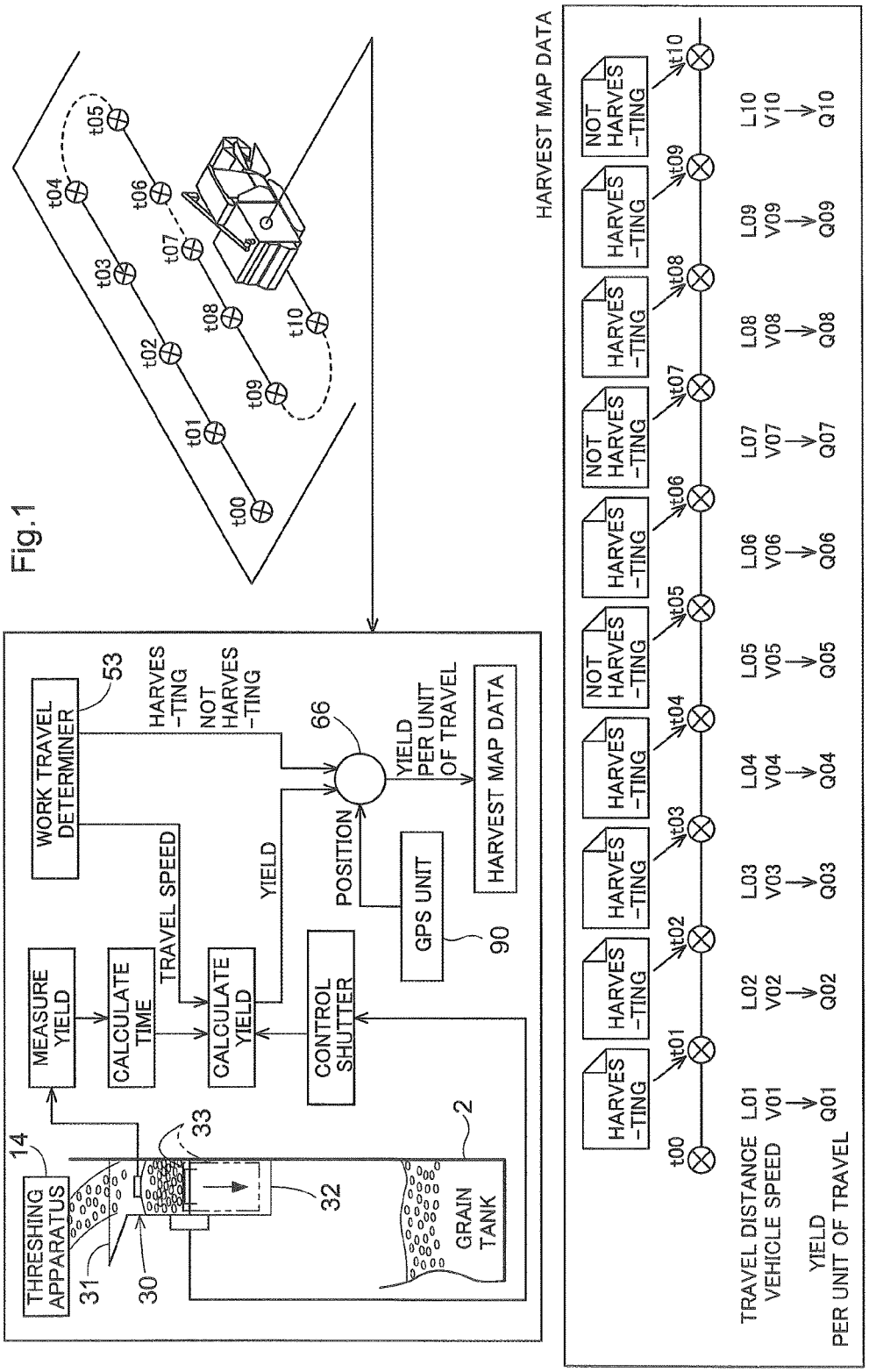
FIG. 1 is a schematic diagram showing a first embodiment (which also applies to FIGS. 2 to 11) and depicts a basic configuration of the first embodiment.

Hereinafter, the first embodiment of the present invention will be described with reference to FIGS. 1 to 11.

Before describing a specific configuration of a combine, which serves as the first embodiment of the present invention, a basic principle thereof will be described using FIG. 1. In an example in FIG. 1, the combine reaps culms of wheat, rice, or the like while traveling in a field, and threshed grains are stored in a grain tank 2, which is mounted in the combine. At this time, in this combine, the amount of grain supplied to the grain tank 2 over time, i.e. the yield, is measured. This combine includes a work travel determiner 53, which determines non-harvest work travel that does not involve grain harvesting, and harvest work travel that involves grain harvesting, based on operation status of a reaper 12 and the like.

To measure the grain yield, the grain tank 2 is provided with a yield measurement container 30 having a first receiving opening 31 for receiving at least some of the grains supplied to this grain tank 2, a first discharge opening 32 for discharging the received grains, and a first shutter 33 for opening and closing a flow passage to the first discharge opening 32. The yield measurement container 30 is arranged such that the first receiving opening 31 faces a flow of grains that are continuously fed from a threshing apparatus 14 to the grain tank 2 during reaping work. The first shutter 33 can be switched between a closing posture for closing the flow passage to the first discharge opening 32, and an opening posture for opening this flow passage. Accordingly, when the first shutter 33 assumes the closing posture, grains are accumulated over time in the yield measurement container 30.

If a given volume of grain is accumulated in the yield measurement container 30, it is then assumed that a yield of a given amount has been obtained, and the accumulation time, which is the required time to elapse for accumulation, is calculated. The travel speed (which is indicated with a prefix V in FIG. 1) at this time point (which is indicated with a prefix t in FIG. 1) is simultaneously acquired. Note that the travel speed (hereinafter referred to as a vehicle speed) acquired here preferably is an average vehicle speed during the accumulation time. The travel distance (which is indicated with a prefix L in FIG. 1) is computed based on the accumulation time and the vehicle speed, and the yield per unit of travel distance (yield per unit of travel) is calculated. Furthermore, if, while grains were being accumulated, the work travel determiner 53 determined that there was non-harvest work travel, this yield per unit of travel is given a tag that indicates non-harvest work travel. If, while grains were being accumulated, it was not at all determined that there was non-harvest work travel, it is assumed that harvest work travel was carried out, and this yield per unit of travel is given a tag that indicates harvest work travel. Furthermore, this yield per unit of travel is also associated with azimuth information (harvesting position information) obtained from an inertial navigator, a GPS unit 90, or the like.

The yield per unit of travel that is thus sequentially calculated is recorded as harvest map data by a harvest map data generator 66. FIG. 1 schematically shows the yield per unit of travel (which is indicated with a prefix Q in FIG. 1) that is recorded as the harvest map data.

Note that, as shown in FIG. 1, the harvesting position information (travel route) regarding the combine is acquired by the GPS unit 90. By matching this harvesting position information with a field map, a yield distribution map that indicates a distribution of a yield per unit of travel distance in a field subjected to harvest work can be generated. Furthermore, an identifier for indicating non-harvest work travel can be provided on this yield distribution map. FIG. 2 shows a simplified example of this yield distribution map. In this yield distribution map, the amount of yield is expressed with color shades, and the identifier for indicating non-harvest work travel is a symbol "x".

Note that, it is possible not only to perform yield measurement, i.e. to measure the yield per unit of travel distance, but also to perform taste measurement as grain quality evaluation. At this time, values of grain components, such as moisture and protein, are used as taste evaluation values for grains such as rice. This combine can calculate a taste value per unit of travel distance based on a measured value of each grain component, and can create a yield-plus-taste distribution map by incorporating this taste value into the harvest map data. The flow of grains from the threshing apparatus 14 to the grain tank 2 has a considerably large flow cross-section. Accordingly, it is favorable to employ a configuration in which the yield measurement container 30 and the taste measurement container are arranged side-by-side, and grains are supplied thereto in parallel from above the respective containers. However, a configuration may also be employed in which the taste measurement container is arranged below the yield measurement container 30, grains for which yield measurement has been finished in the yield measurement container 30 are temporarily accumulated again in the taste measurement container, and grain components (taste values) of those grains are measured.

In grain taste measurement, it is favorable to measure the content of moisture and protein in grains. An optical measurement method is suitable for accurately performing such taste measurement. In this optical measurement method, a light beam is radiated to the grains that are temporarily accumulated in the taste measurement container, and measured values concerning moisture and protein components are obtained by performing spectral analysis on a returned light beam.

Note that, to assign, to a harvesting position (field position) obtained by the GPS unit 90 or the like, a yield and a taste of grains harvested at this position, it is necessary to give consideration to a temporal delay from a time point when culms were reaped until a time point of measurement performed on the grains included in these reaped culms. This delay time can be calculated based on processing time from when the first-reaped culms are detected by a plant foot sensor until grains arrive at the yield measurement container 30, and the travel speed of the combine at that time. With the thus-calculated delay time, a data set including the yield and taste can be accurately assigned to each harvesting position.

Figure 3:
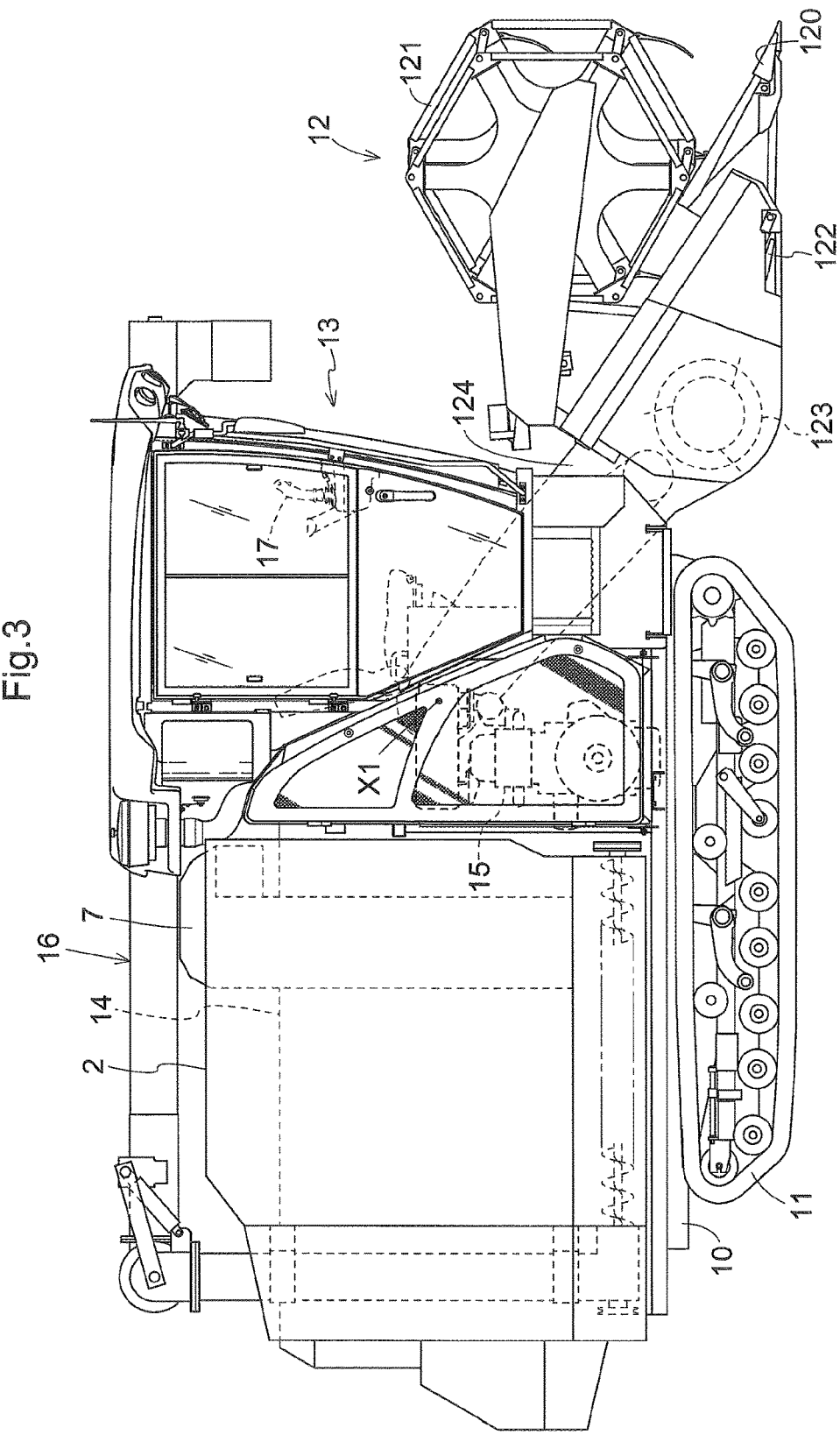
FIG. 3 is a side view showing an embodiment of a combine according to the present invention.
Figure 4:
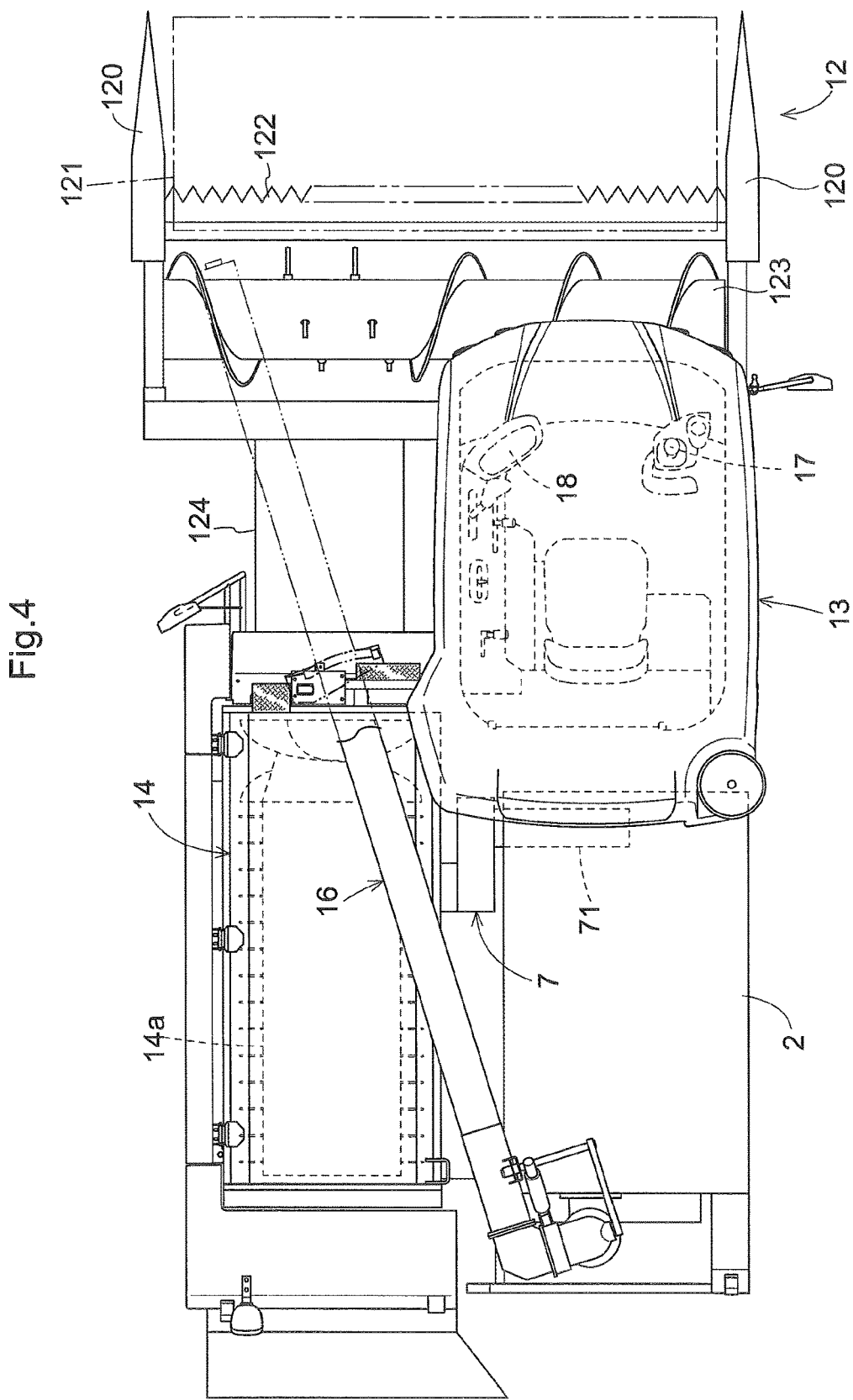
FIG. 4 is a plan view of the combine in FIG. 3.

Next, a specific embodiment of the combine according to the present invention will be described using the drawings. FIG. 3 is a side view of a normal combine, which is an example of the combine. FIG. 4 is a plan view thereof. This combine includes a body frame 10 that is formed by connecting a plurality of steel materials such as a groove-shaped material and a square pipe material. A pair of left and right crawler traveling apparatuses 11 are attached to the lower portion of the body frame 10. An engine 15 is mounted on the front side in a right half portion of the body frame 10, and a cabin-like driving section 13 is formed thereabove. A steering lever 17, a monitor 18, and the like are arranged in the driving section 13. The reaper 12 is attached to the front portion of the body frame 10 so as to be able to be raised and lowered. The threshing apparatus 14 for threshing reaped culms that are supplied from the reaper 12 and thrown, in a whole-culm state, into the threshing apparatus 14, the grain tank 2 for accumulating grains supplied from the threshing apparatus 14 by a grain supply apparatus 7, and an unloader 16 for discharging the grains accumulated in the grain tank 2 to the outside are attached to the rear portion of the body frame 10.

The reaper 12 is configured to be able to be raised and lowered around a first horizontal axis X1, which extends horizontally relative to the body. The reaper 12 enters a raised state during non-harvest work, such as when turning around, and enters a lowered state to come close to a field surface during harvest work. The reaper 12 includes a pair of left and right dividers 120 for pushing planted culms aside, a raking reel 121 that is driven to rotate to rearwardly rake in planted culms, a reaping blade apparatus 122 for reaping planted culms that are raked in by the raking reel 121, an auger drum 123 for rearwardly feeding culms reaped by the reaping blade apparatus 122, and a feeder 124 for conveying reaped culms fed from the auger drum 123 to the front end of the threshing apparatus 14.

The threshing apparatus 14 is configured to thresh reaped culms supplied from the feeder 124, using a cylinder 14a that is driven to rotate. The grain tank 2 is arranged in a right rear part above the body frame 10, and is located on the rear side of the driving section 13, adjacent to the threshing apparatus 14 on the right side. A grain supply apparatus 7, which functions as a supply pipe for supplying grains from the threshing apparatus 14 to the grain tank 2, is arranged between the threshing apparatus 14 and the grain tank 2. The final stage of the grain supply apparatus 7 is configured as a screw conveyer 71, and projects to enter the inside of the grain tank 2.

Figure 5:
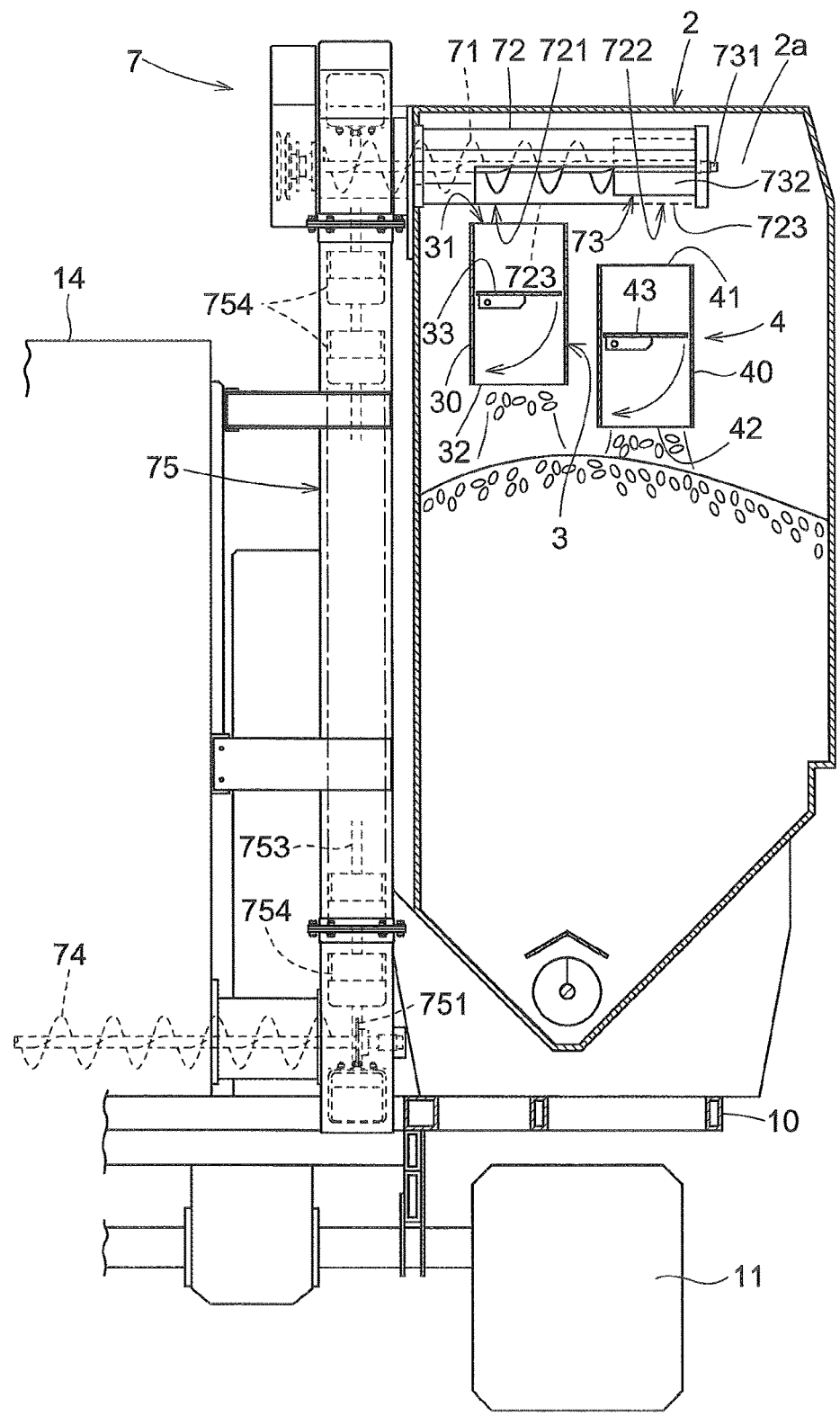
FIG. 5 is an elevational view of a yield measurement container and a taste measurement container that are attached within a grain tank in the combine in FIG. 3.
Figure 6:
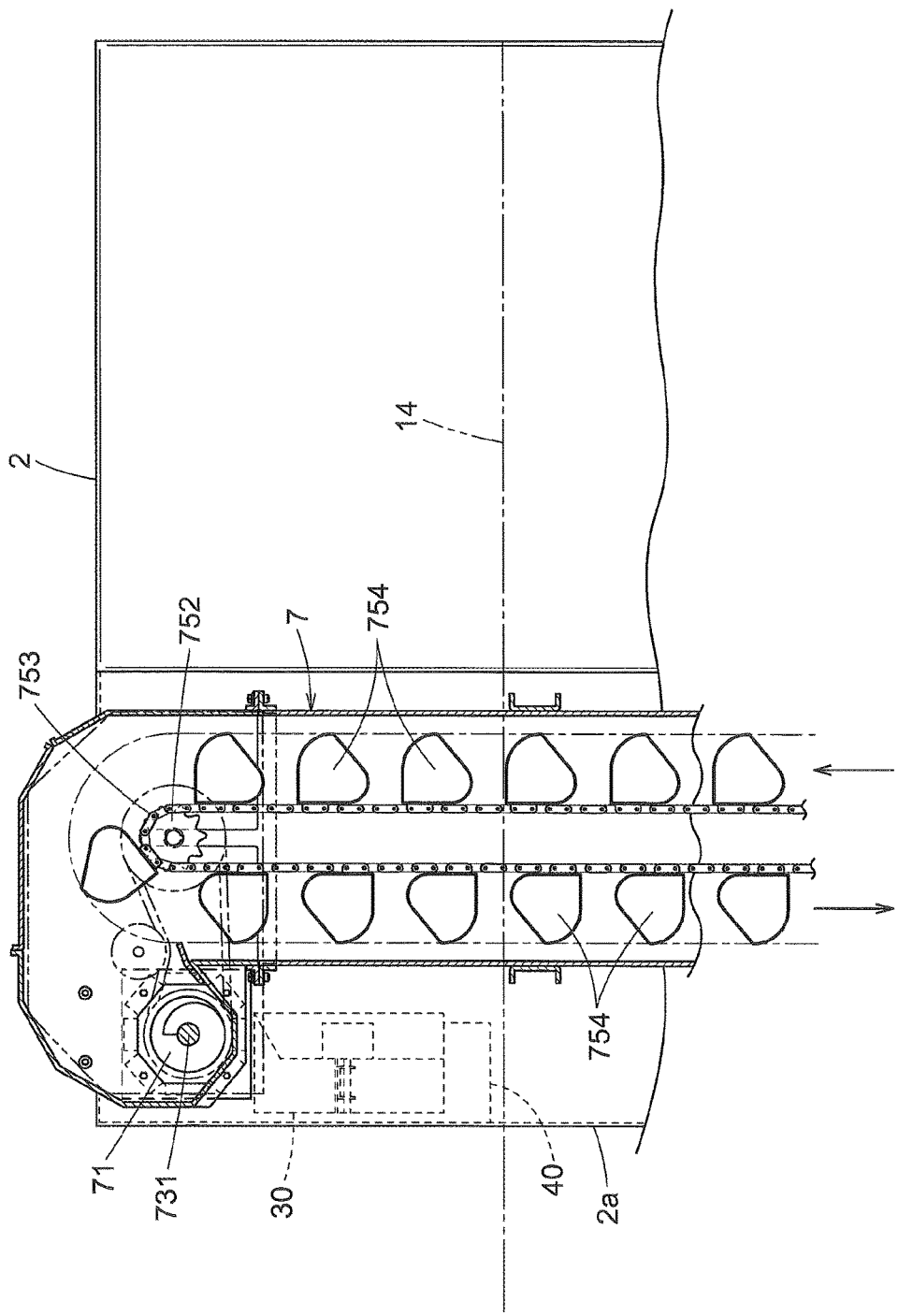
FIG. 6 is a side view of the yield measurement container and the taste measurement container attached within the grain tank.

As shown in FIGS. 5 and 6, the grain supply apparatus 7 is constituted by a clean grain collection screw 74, a lift conveyor 75, a screw conveyer 71, and impellers 73. The clean grain collection screw 74, which is attached to the bottom of the threshing apparatus 14 so as to be oriented horizontally, is connected, at its conveyance terminal, to the lift conveyor 75, which is of a bucket type. The lift conveyor 75 is a bucket conveyer in which a plurality of buckets 754 are attached at even intervals to the outer circumferential side of an endless rotary chain 753, which is wound around a driving sprocket 751 and a driven sprocket 752. The lift conveyor 75 is connected, at its conveyance terminal, to the screw conveyer 71. The screw conveyer 71 is surrounded by a housing 72, which has an octagonal (or any other polygonal, or circular) cross-sectional shape. A pair of impellers 73, which integrally rotate with the screw conveyer 71, are arranged at a terminal of the screw conveyer 71.

As shown in FIGS. 5 and 6, the yield measurement container 30 in a yield measurement apparatus 3 for measuring the grain yield, and a taste measurement container 40 in a taste measurement apparatus 4 for measuring grain taste are arranged within the grain tank 2. The yield measurement apparatus 3 measures a yield per time unit based on the time during which a given amount of grain is accumulated in the yield measurement container 30. Similarly, the taste measurement apparatus 4 measures grain components such as moisture and protein through spectrometry performed on grains that are temporarily accumulated in the taste measurement container 40.

As shown in FIGS. 5, 6, 7, and 8, the yield measurement container 30 and the taste measurement container 40 are attached side-by-side to the upper portion of a front wall 2a of the grain tank 2 within the grain tank 2. The yield measurement container 30 is a cylindrical container. A first receiving opening 31 for receiving grains is formed at the upper end of the yield measurement container 30. A first discharge opening 32 for discharging received grains is formed at the lower end of the yield measurement container 30. A first shutter 33 is provided between the first receiving opening 31 and the first discharge opening 32, the first shutter 33 being for temporarily accumulating grains received through the first receiving opening 31, and discharging, through the first discharge opening 32, a given amount of grain that has been accumulated. Similarly, the taste measurement container 40 is also a cylindrical container. A second receiving opening 41 for receiving grains is formed at the upper end of the taste measurement container 40. A second discharge opening 42 for discharging received grains is formed at the lower end of the taste measurement container 40. A second shutter 43 is provided between the second receiving opening 41 and the second discharge opening 42, the second shutter 43 being for temporarily accumulating grains received through the second receiving opening 41, and discharging, through the second discharge opening 42, a given amount of grain that has been accumulated.

In the housing 72 of the screw conveyer 71 provided in the uppermost portion of the front wall 2a of the grain tank 2, a first opening 721 and a second opening 722, which serve as grain discharge openings of the grain supply apparatus 7, are arranged side-by-side in the grain conveyance direction. The first opening 721 and the second opening 722 have a size that substantially occupies the lower half of the housing 72 in a horizontal cross-sectional direction of the housing 72. The yield measurement container 30 is arranged such that the first receiving opening 31 is located below the first opening 721. The taste measurement container 40 is arranged such that the second receiving opening 41 is located below the second opening 722. The screw conveyer 71 extends up to the upper side of the first opening 721. Half or more of the grains conveyed by the screw conveyer 71 is discharged through the first opening 721.

The impellers 73 for receiving grains conveyed by the screw conveyer 71 each have a rotary shaft 731 that extends in an extending direction of the housing 72 that serves as a grain supply pipe, i.e. in the axial direction of the screw conveyer 71, and a plurality of blade bodies 732 that radially extend in the radius direction from this rotary shaft 731. A wire net 723, which serves as a porous member, is stretched over the second opening 722. Grains that are pushed out by the blade bodies 732 pass through the wire net 723, and some of those grains are supplied to the taste measurement container 40 through the second receiving opening 41. The wire net 723, which exhibits a grain-discriminating effect due to its pore size, suppresses mixing of culms, leaves, or the like in the grains supplied to the taste measurement container 40.

Figure 7:
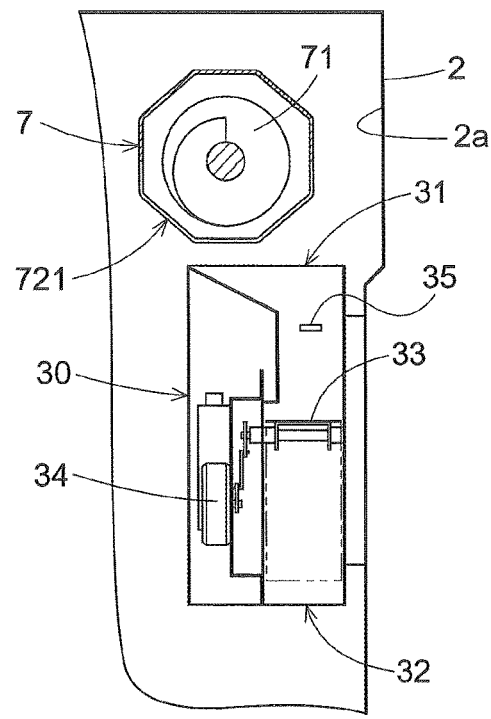
FIG. 7 is a cross-sectional view of the yield measurement container attached to the grain tank.

As shown in FIG. 7, the first shutter 33, which is a grain shutter in the yield measurement container 30, can be pivoted by an actuator 34 between the closing posture for interrupting the passage of grains and the opening posture for allowing the passage of grains. Upon the first shutter 33 pivoting to assume the closing posture, grains that have fallen from the first opening 721 and entered the yield measurement container 30 through the first receiving opening 31 begin to accumulate on the first shutter 33, which has assumed the closing posture. When the amount of accumulated grains reaches a given amount, it is detected by a proximity sensor 35. At this time, the time from when the first shutter 33 pivots to assume the closing posture until the accumulation of the given amount of grain is detected by the proximity sensor 35 is measured. The yield per time unit is thus obtained, and the yield per unit of travel distance is calculated based on the thus-measured time and the vehicle speed. By repeating this processing, the yield per unit of travel distance along the travel trajectory of the combine is calculated.

Figure 8:
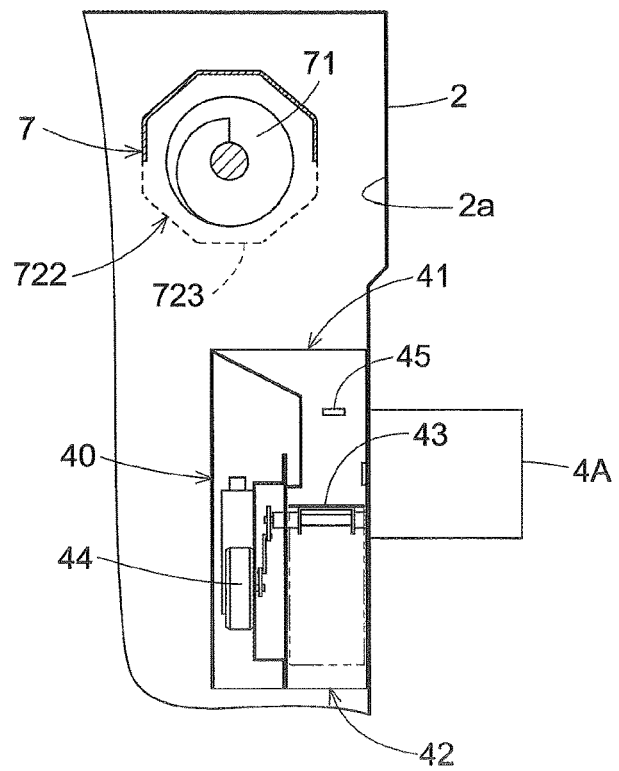
FIG. 8 is a cross-sectional view of the taste measurement container attached to the grain tank.

As shown in FIG. 8, the second shutter 43, which is a grain shutter in the taste measurement container 40, can also be pivoted by an actuator 44 between the closing posture for interrupting the passage of grains and the opening posture for allowing the passage of grains. Note that, in this embodiment, the actuators 34 and 44 for the first shutter 33 and the second shutter 43 are each constituted by an electric motor. Upon the second shutter 43 pivoting to assume the closing posture, grains that have fallen from the second opening 722 and entered the taste measurement container 40 through the second receiving opening 41 begin to accumulate on the second shutter 43, which has assumed the closing posture. When it is detected by a proximity sensor 45 that the accumulated grains have reached a given height, the taste of grains is measured. In this embodiment, a taste measurement unit 4A, which constitutes the taste measurement apparatus 4, includes a light transmitting/receiving head that projects into the taste measurement container 40, and employs a spectrometry method for measuring a spectrum of light that returns after passing through grains. The taste measurement unit 4A can measure a grain moisture value and a protein value. The taste measurement unit 4A outputs a taste value that includes at least one of the measured values related to moisture and protein, which are grain components, as well as a computed taste value that is obtained based on a ratio between those components, and the like. After the taste measurement is finished, the second shutter 43 pivots to assume the opening posture, and the accumulated grains are discharged. Subsequently, the second shutter 43 pivots to assume the closing posture, and taste measurement for grains that are next accumulated starts. By repeating this processing, the taste value per unit of travel distance along the travel trajectory of the combine is calculated.

Figure 9:
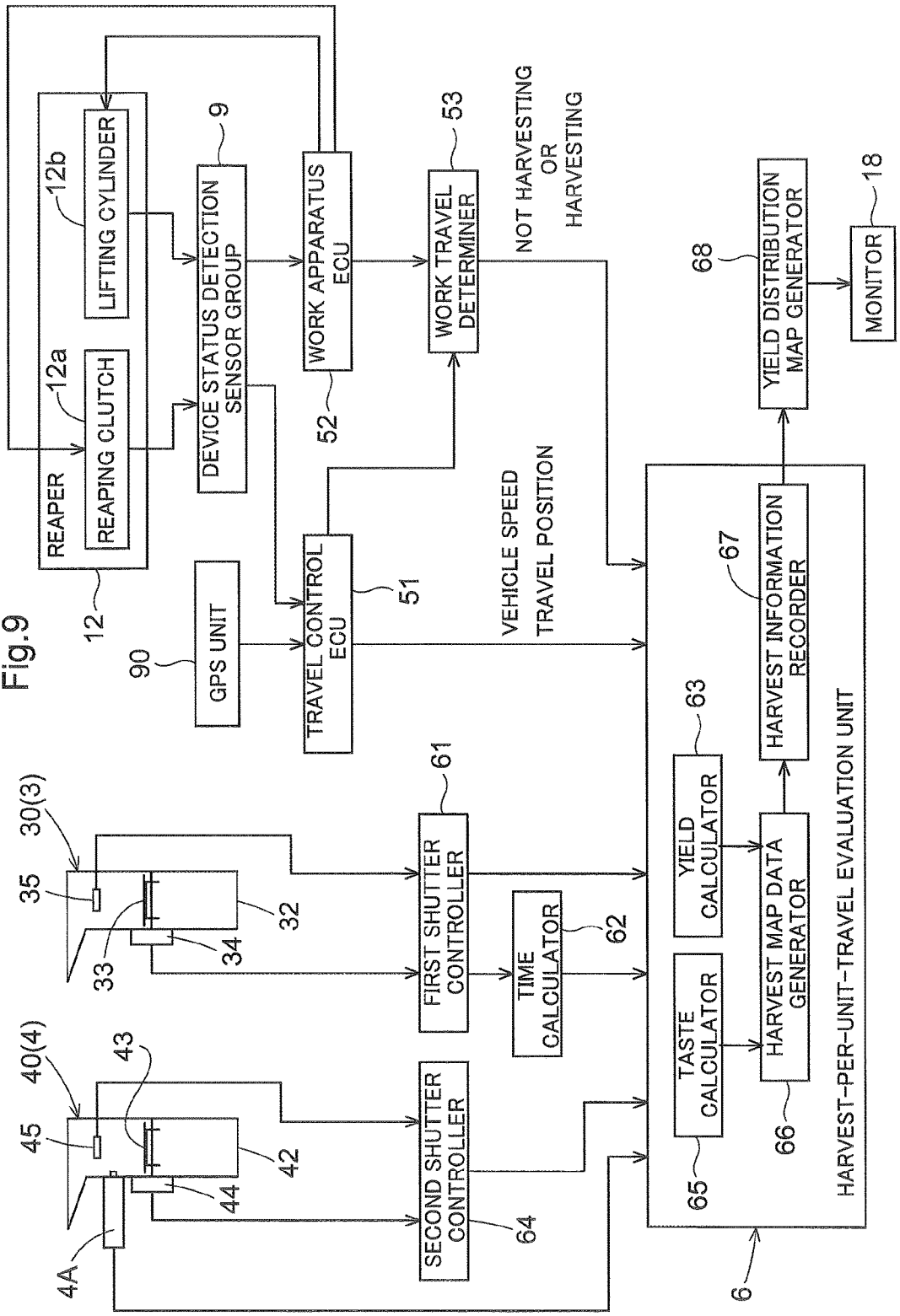
FIG. 9 is a functional block diagram showing functional units related to the present invention in a control system of the combine in FIG. 3.

FIG. 9 shows a functional block diagram for illustrating a control system related to calculation of the yield and taste per unit of travel distance (i.e. per unit of minute parcel of a field) of this combine. This control system substantially employs the basic principle shown in FIG. 1. This combine includes, as an electronic control unit related to yield calculation and taste calculation, a travel control ECU 51, a work apparatus ECU 52, and a harvest-per-unit-travel evaluation unit 6 so as to be able to exchange data through an in-vehicle LAN or other data communication line.

The travel control ECU 51 is an ECU for handling various kinds of control information regarding vehicle travel. For example, the travel control ECU 51 has a function of rendering, as travel information, data such as the vehicle speed, travel distance, travel trajectory (travel position), engine speed, and fuel consumption that are acquired from a device status detection sensor group 9, which includes various sensors, switches, buttons, and the like, through the in-vehicle LAN. The travel control ECU 51 acquires azimuth information from the GPS unit 90 mounted in this combine, in order to calculate the travel trajectory, which is constituted by chronological travel positions (azimuth positions such as latitude and longitude). The work apparatus ECU 52 is an ECU for controlling reaping and harvesting apparatuses such as the reaper 12 and the threshing apparatus 14. The work apparatus ECU 52 is connected to the device status detection sensor group 9 in order to acquire data indicating the operation status and running status of various devices that constitute the work apparatuses. Thus, the work apparatus ECU 52 can output work status information that indicates work status. Also, the work apparatus ECU 52 sends an operation control signal to various devices that constitute the work apparatuses, such as a reaping clutch 12a and a lifting cylinder 12b for raising and lowering the reaper 12.

The work travel determiner 53 determines whether the combine is traveling for harvest work or is traveling for non-harvest work, based on work status information received from the work apparatus ECU 52 and travel status information received from the travel control ECU 51. The determination result is given to the harvest-per-unit-travel evaluation unit 6. For example, if it is detected that the reaper 12 has been raised to a given height or more and the combine is traveling, based on a signal from a sensor for detecting movement of the lifting cylinder 12b, it is determined that the combine is traveling for non-harvest work (not harvesting). Also, if it is detected that the reaping clutch 12a has been turned off and the combine is traveling with the reaper 12 undriven, it is determined that the combine is traveling for non-harvest work (not harvesting). Various other rules for determining that the combine is traveling for non-harvest work based on appropriate detection signals are set in the work travel determiner 53.

A first shutter controller 61 for sending a control signal to the actuator 34 to open and close the first shutter 33, a second shutter controller 64 for giving a control signal to the actuator 44 to open and close the second shutter 43, and the taste measurement unit 4A are connected to the harvest-per-unit-travel evaluation unit 6. Furthermore, the first shutter controller 61 is also connected to a time calculator 62, and the time calculator 62 is connected to the harvest-per-unit-travel evaluation unit 6. The time calculator 62 measures the accumulation time, which is the time taken until a given amount of grain is accumulated in the yield measurement container 30. Note that, here, the grain evaluation control apparatus is constituted by the first shutter controller 61, the second shutter controller 64, the taste measurement unit 4A, and the harvest-per-unit-travel evaluation unit 6.

The harvest-per-unit-travel evaluation unit 6 includes a yield calculator 63, a taste calculator 65, a harvest map data generator 66, and a harvest information recorder 67. The yield calculator 63 calculates the yield per unit of travel based on the accumulation time provided from the time calculator 62 and the vehicle speed during this accumulation time. The taste calculator 65 calculates a taste value per unit of travel distance (taste value per unit of travel) based on the measured value provided from the taste measurement unit 4A. The harvest map data generator 66 generates harvest map data in which the yield per unit of travel, the taste value per unit of travel, the travel position (travel trajectory) at which grains subjected to taste measurement and yield measurement were harvested, and the determination result obtained by the work travel determiner 53 are associated with one another. The generated harvest map data is temporarily recorded in a memory by the harvest information recorder 67.

The control system of this combine includes a yield distribution map generator 68 for generating a yield distribution map based on the harvest map data that is read out from the memory. The yield distribution map is a graph of a distribution of the yield per unit of travel distance in the field subjected to work, or more specifically, a distribution of the yield and the taste value (moisture and protein components) of harvested grains assigned to each minute parcel of a field. Furthermore, this yield distribution map is given an identifier that enables a minute parcel where non-harvest work travel has occurred to be distinguished from a minute parcel where harvest work travel has occurred. The thus-generated yield distribution map is displayed on the monitor 18, such as an LCD, that is provided in the driving section 13.

Next, a flow of yield measurement performed by the yield measurement apparatus 3 will be described.

In an initial state where reaping work has not started, the first shutter 33 assumes the opening posture. After the reaping work starts, when a timing at which grains are to be discharged to the grain tank 2 is reached, the first shutter 33 switches to the closing posture, and grains begin to accumulate in the yield measurement container 30. Simultaneously, the time calculator 62 starts measuring time (generation of a count signal). Upon the amount of grain accumulated in the yield measurement container 30 reaching a given amount, the proximity sensor 35 operates, and an appropriate amount detection signal is generated.

With the generation of this appropriate amount detection signal as a trigger, the time measurement performed by the time calculator 62 stops, and the first shutter 33 switches to the opening posture. A time measurement value (accumulation time) obtained by the time calculator 62 is the time taken until the given amount of grain is accumulated in the yield measurement container 30. Here, assuming that the given amount is q and the accumulation time is t, the yield per time unit is obtained by q/t. Furthermore, assuming that the vehicle speed while the grains to be accumulated are being harvested is v, the yield per unit of travel distance (yield per unit of travel) is obtained by q/(t*v). Also, assuming that the reaping width (harvesting width) of the reaper 12 is w, the yield per unit of travel area is obtained by q/(t*v*w), which will be referred to as the yield per unit of travel here. This is because, commonly, the yield per unit of travel distance is normalized by the reaping width (harvesting width).

Similarly, in an initial state where reaping work has not started, the second shutter 43 assumes the opening posture. After the reaping work starts, when a timing at which grains are to be discharged to the grain tank 2 is reached, the second shutter 43 switches to the closing posture, and grains begin to accumulate in the taste measurement container 40. Simultaneously, time measurement is started by the time calculator 62. Upon the amount of grain accumulated in the taste measurement container 40 reaching a given amount, the proximity sensor 45 operates, and an appropriate amount detection signal is generated.

With the generation of this appropriate amount detection signal as a trigger, taste measurement is started by the taste measurement unit 4A. A moisture value and a protein value are measured through analysis of the wavelength of the light beam radiated to the grains. The measurement time required for the taste measurement is about several seconds to several tens of seconds. After the taste measurement has ended, the second shutter 43 switches to the opening posture, and grains in the taste measurement container 40 are discharged from the taste measurement container 40 to the grain tank 2. After grains have been discharged from the taste measurement container 40, the second shutter 43 switches to the closing posture and proceeds to the next taste measurement, based on a command from the taste calculator 65.

If the measurement time for the taste measurement is longer than the measurement time for the yield measurement, a yield and a taste value that are calculated at the closest timings are combined.

Note that, as can be understood from FIG. 5, if the amount of grain contained in the grain tank 2 increases, grains move to the inside of the yield measurement container 30 and the taste measurement container 40 respectively from the first discharge opening 32 and the second discharge opening 42. The first shutter 33 that forms the bottom of the accumulation space in the yield measurement container 30, and the second shutter 43 that forms the bottom of the accumulation space in the taste measurement container 40 are configured to open downward. For this reason, the opening and closing operations of the first and second shutters 33 and 43 cannot be performed as usual due to the grains that have thus moved to the inside of the containers. As has been described using FIGS. 7, 8, and 9, the first shutter 33 and the second shutter 43 use electric motors as the actuators 34 and 44 for the opening and closing operations. Accordingly, if the opening and closing operations of the first shutter 33 and the second shutter 43 are not smoothly performed due to the increase in grains, the electric motors are inconvenienced. For this reason, in this embodiment, an abnormal state of the opening and closing operations is detected using a signal from a potentiometer, which is mounted for detecting the opening and closing positions of the first shutter 33 and the second shutter 43. Specifically, with a voltage signal from the potentiometer as a pivot angle, the time from when the opening or closing operation starts until a given pivot angle is reached is measured. If the measured time taken until the given pivot angle is reached exceeds a preset threshold range, it is assumed that a shutter operation failure has occurred, measurement is stopped, and the operation of the first shutter 33 and the second shutter 43 stops.

Modifications of First Embodiment

Modifications of the above embodiment will be described below. The following modifications are similar to the above embodiment except for the content described below. The above embodiment and the following modifications may be combined as appropriate provided there is no inconsistency. Note that the scope of the present invention is not limited to the above embodiment and the following modifications.

(1) In the above embodiment, the yield distribution map generator 68 is incorporated in the control system of the combine. However, alternatively, the yield distribution map generator 68 may be built in an external management server 100, as shown in FIG. 10. With this configuration, the harvest map data generated by the harvest map data generator 66 is transmitted from a transmitter-receiver 101, which is provided in the control system of the combine, to a transmitter-receiver 102 of a management server 100 via a wireless data communication line. Based on the harvest map data received by the transmitter-receiver 102, the yield distribution map is generated by the yield distribution map generator 68 in the management server 100, and is transmitted to the control system of the combine.

(2) In the above embodiment, the yield per unit of travel and the taste value per unit of travel are associated with the travel position (travel route). Furthermore, the harvest map data is created in which the determination result regarding travel that indicates work travel or non-work travel is added to the travel position (travel route). Alternatively, yield map data in which only the yield per unit of travel and the determination result regarding travel are associated with the travel position (travel route), and taste value map data in which only the taste value per unit of travel and the determination result regarding travel are associated with the travel position (travel route) may be separately created.

(3) In the above embodiment, the harvest-per-unit-travel evaluation unit 6 is built as one of the ECUs mounted in the combine. However, at least the harvest-per-unit-travel evaluation unit 6 can also be configured, as a grain evaluation control apparatus, to be an application program on a mobile communication terminal, which includes a portable control device such as a mobile PC that is removable from the combine, a smartphone carried by an operator, and the like.

(4) In the above embodiment, the yield measurement container 30 and the taste measurement container 40 are attached to the front wall 2a of the grain tank 2. However, these containers may be attached to any other side walls.

(5) In the above embodiment, the first opening 721 and the second opening 722 are provided side-by-side in the grain conveyance direction in the housing 72 of the screw conveyer 71, which is located at the final stage of the grain supply apparatus 7. However, a configuration may be employed in which two branches are provided at the leading end of the screw conveyer 71 to supply grains to the yield measurement container 30 and the taste measurement container 40.

(6) In the above embodiment, the yield measurement container 30 and the taste measurement container 40 are each constituted by a tubular body having a rectangular cross section. However, these containers may be tubular bodies having a cross section of any other shape. A wall face of the grain tank 2 may also be used as at least one side wall of the yield measurement container 30 and the taste measurement container 40.

(7) In the above embodiment, a normal combine is dealt with as the combine. However, of course, the present invention is also applicable to any other type of combine, such as a self-threshing combine.

Figure 11A:
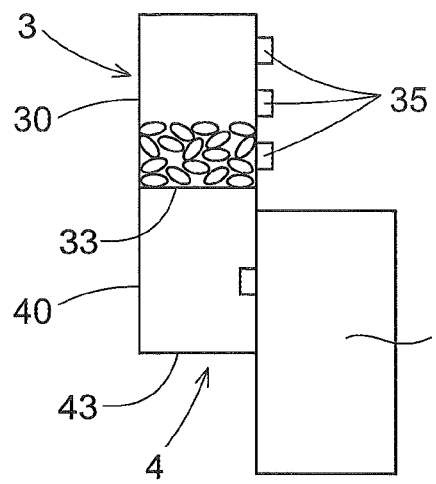
FIG. 11 is a schematic diagram showing various arrangement patterns of the taste measurement container and a taste measurement unit.
Figure 11C:
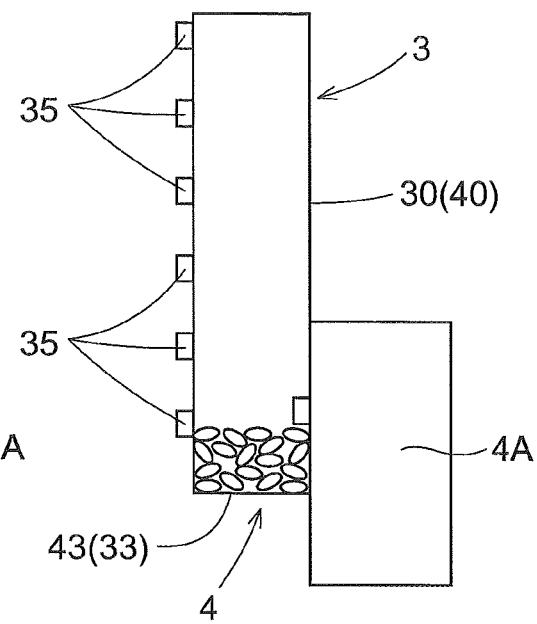
Figure 11B:
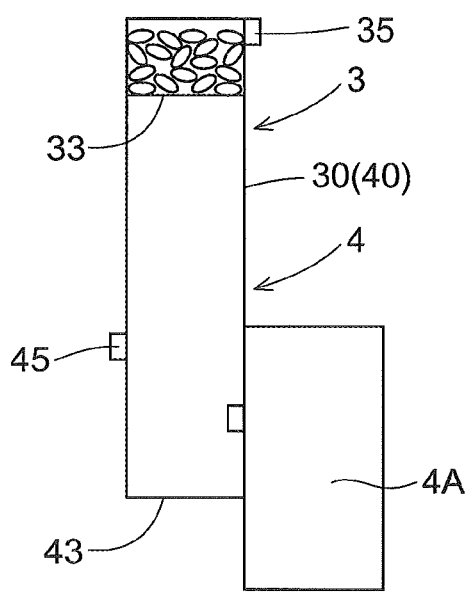
Figure 11D:
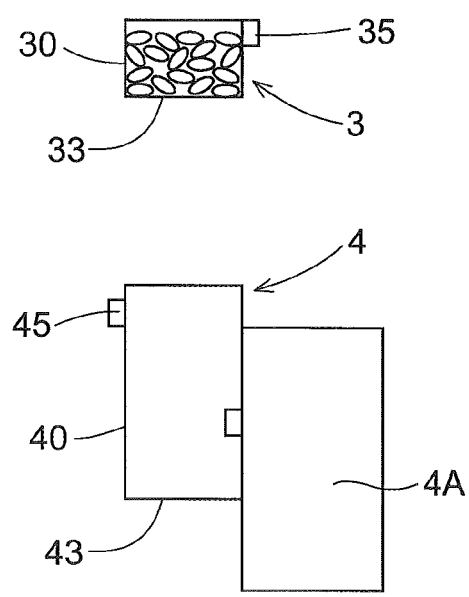

(8) In the above embodiment, the yield measurement container 30 and the taste measurement container 40 are separately configured. However, as shown schematically in FIG. 11, a grain supply structure can be simplified by using a common grain supply structure for both the yield measurement container 30 and the taste measurement container 40. For example, in a configuration shown in FIG. 11A, the yield measurement container 30 and the taste measurement container 40 are integrated by a common tubular body. The upper part thereof is used as the yield measurement container 30, and the lower part is used as the taste measurement container 40. Yield measurement is performed using grains that are accumulated in the yield measurement container 30 as a result of the first shutter 33 closing. The first shutter 33 is opened after the yield measurement ends. The accumulated grains are discharged into the taste measurement container 40 with the second shutter 43 closed. Then, taste measurement is performed by the taste measurement unit 4A. The second shutter 43 is opened after the taste measurement ends, and grains are discharged from the taste measurement container 40. Since the amount of grain accumulated in the yield measurement container 30 during the time required for taste measurement is different depending on the field, a plurality of (three in FIG. 11A) proximity sensors 35 are prepared, and an appropriate one for the yield achieved during the taste measurement time is selected. A configuration in FIG. 11B has a structure similar to that in FIG. 11A, but is different in that the volume of the taste measurement container 40 is several times the volume of the yield measurement container 30. Thus, yield measurement can be performed several times during taste measurement. Accordingly, both measurements can be performed even if the time required for taste measurement is several times longer than the time required for yield measurement. However, taste measurement can be performed only once while yield measurement is performed several times. In FIG. 11C, the yield measurement container 30 is also used as the taste measurement container 40, and the second shutter 43 also functions as the first shutter 33. However, since the amount of grain accumulated while taste measurement is performed is measured, many proximity sensors 35 are required. Meanwhile, there is an advantage in that only one shutter is required. In FIG. 11D, the yield measurement container 30 and the taste measurement container 40 are separately configured. However, the taste measurement container 40 is arranged immediately below the yield measurement container 30. Accordingly, the timing at which grains are received in the taste measurement container 40 depends on the timing at which grains are discharged from the yield measurement container 30.

Second Embodiment

A second embodiment will be described below with reference to FIGS. 12 to 13. The second embodiment is based on an assumption that the yield and taste are measured using a measurement container for temporarily accumulating grains. The following description will mainly focus on differences in a basic principle thereof from that of the above-described first embodiment.

Figure 12:
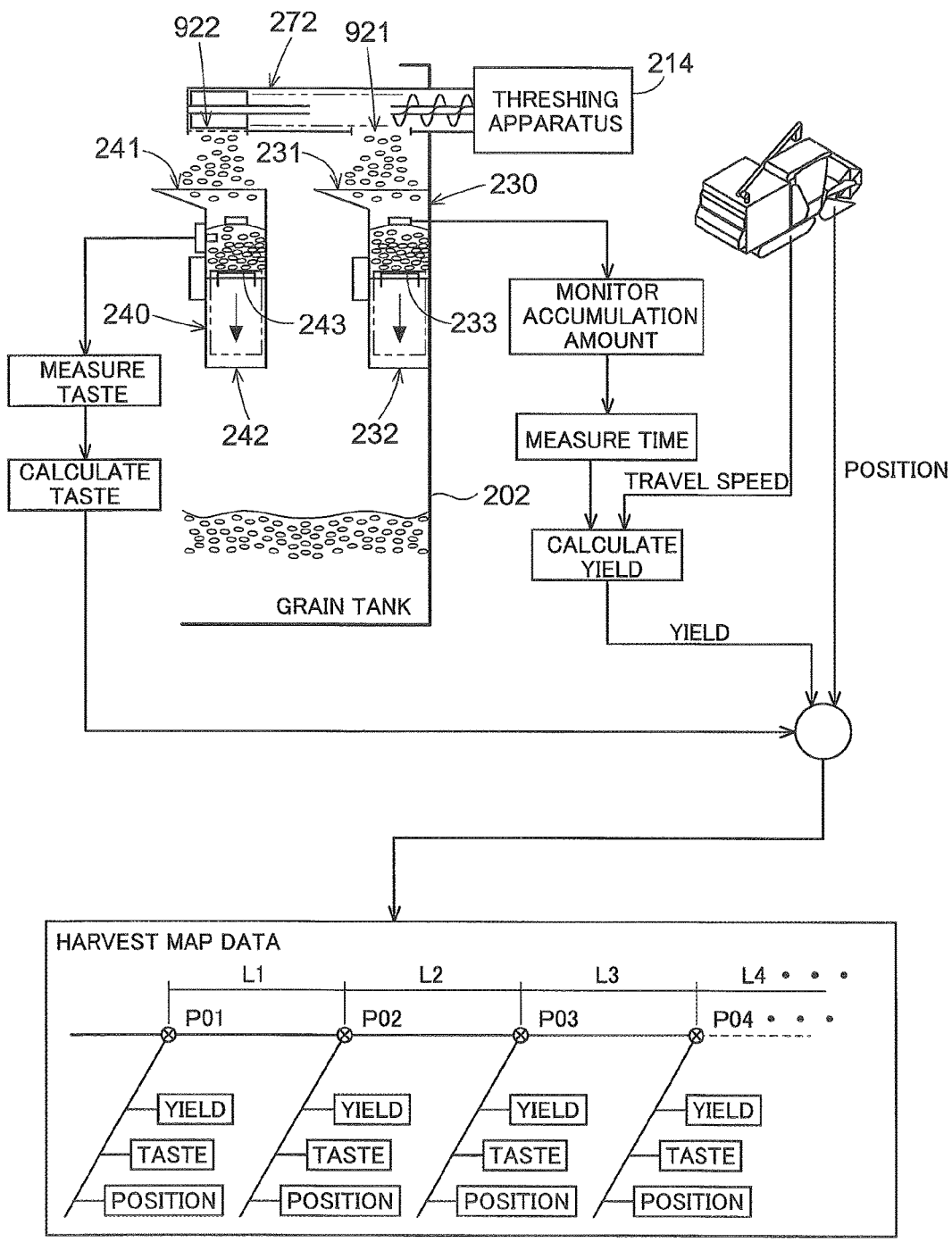
FIG. 12 is a schematic diagram showing a second embodiment (which also applies to FIG. 13) and depicting a basic configuration of the second embodiment.

FIG. 12 shows an exemplary combine for reaping culms of wheat, rice, or the like while traveling in a field, and storing grains obtained by a threshing apparatus 214 in a grain tank 202. At this time, in this combine, the amount of grain supplied from the threshing apparatus 214 to the grain tank 202 over time, i.e. the yield, is measured. Furthermore, the taste (moisture, protein etc.) of these grains can also be measured.

In an example shown in FIG. 12, a yield measurement container 230 for yield measurement and a taste measurement container 240 for taste measurement (here, measurement of moisture and protein components) are attached to an inner wall of the grain tank 202. The yield measurement container 230 has a first receiving opening 231 for receiving at least some of the grains supplied to this grain tank 202, a first discharge opening 232 for discharging the received grains, and a first shutter 233 that opens and closes to enable the grains received through the first receiving opening 231 to temporarily accumulate, or to enable the gains to flow toward the first discharge opening 232. The taste measurement container 240 has a structure similar to that of the yield measurement container 230, and is arranged close to the yield measurement container 230 side-by-side. The taste measurement container 240 has a second receiving opening 241 for receiving at least some of the grains supplied to this grain tank 202, a second discharge opening 242 for discharging the received grains, and a second shutter 243 that opens and closes to enable the grains received through the second receiving opening 241 to temporarily accumulate, or to enable the gains to flow toward the second discharge opening 242.

In yield calculation processing, the amount of grain accumulated in the yield measurement container 230 after the first shutter 233 has switched to assume an accumulation-enabled posture is monitored, and the yield per unit of travel time (yield per unit of travel) is calculated based on the time during which a given amount of grain has accumulated and the vehicle speed of the combine. After single yield calculation has ended, the first shutter 233 is switched to a discharging (open) posture, and accumulated grains are discharged. Immediately thereafter, the first shutter 233 is restored to an accumulating (close) posture, and the next yield calculation is performed.

In taste calculation processing, upon the second shutter 243 being switched to an accumulating (close) posture, and a given volume of grain being accumulated in the taste measurement container 240, taste measurement using a spectrometric method starts, and a taste value is calculated. After the taste measurement ends, the second shutter 243 is switched to a discharging (open) posture, and accumulated grains are discharged. Immediately thereafter, the second shutter 243 is restored to an accumulation-enabled posture, and the processing proceeds to the next taste calculation.

The taste value, which was calculated at substantially the same timing as the timing at which the yield per unit of travel was calculated as per the yield calculation processing, is associated with travel data of the combine, and is sequentially recorded as harvest map data, together with the yield per unit of travel, as the combine travels for harvest work.

A grain supply pipe that connects the threshing apparatus 214 to the grain tank 202 is constituted by a screw conveyer, a bucket conveyer, impellers, and the like. In this regard, as shown schematically in FIG. 12, a terminal of the supply pipe serves as an intra-grain-tank pipe portion and enters the upper portion of the grain tank 202. In the housing 272 in the intra-grain-tank pipe portion, a first opening 921 and a second opening 922, which are open spaced apart in the grain supply direction, are formed. The first receiving opening 231 is located below the first opening 921, and grains discharged from the first opening 921 are thrown into the yield measurement container 230. The second receiving opening 241 is located below the second opening 922, and grains discharged from the second opening 922 are thrown into the taste measurement container 240. In yield measurement, a good proportional relationship needs to be established between the actual amount of harvest per time unit and the amount of grain thrown into the yield measurement container 230 per time unit. Accordingly, the first opening 921 is formed at a position closer to the threshing apparatus 214 than the second opening 922 in the grain supply direction in the intra-grain-tank pipe portion. Thus, the amount of grain discharged from the first opening 921 is not affected by grain discharge from the second opening 922. Also, in taste measurement in which a measured value related to a component such as moisture or protein is obtained by performing spectrometric analysis on a light beam radiated to grains and then returned, mixing of foreign matter such as straw in the taste measurement container 240 needs to be avoided as much as possible. For this reason, it is favorable that a porous member through which grains pass but straw is unlikely to pass, such as a punching metal, is stretched over the second opening 922.

The harvest map data, which includes the yield per unit of travel that is chronologically obtained by yield calculation processing and a chronological taste value that is chronologically obtained by taste measurement processing, is associated with harvesting positions (which is indicated by a prefix P in FIG. 12) in the field, as shown in FIG. 12. These harvesting positions are absolute azimuth positions represented by latitude and longitude, or relative azimuth positions represented by coordinate positions in field coordinates. Accordingly, based on this harvest map data, a yield/taste distribution map can be generated that indicates a distribution of the yield and taste per unit of travel distance in a field subjected to work, i.e. per minute parcel of the field. FIG. 13 shows an example of this yield/taste distribution map. Note that part of the taste distribution is omitted to avoid the diagram being complex. Of course, it is also possible to generate a yield distribution map or a taste distribution map to separate the yield from the taste.

Note that, to assign, to a harvesting position (field position) obtained by a GPS unit or the like, a yield and taste of grains harvested at this position, consideration needs to be given to a temporal delay from a time point at which culms are reaped until a time point at which measurement is performed on grains included in the reaped culms. This delay time can be calculated based on processing time from when the first-reaped culms are detected by a plant foot sensor until grains arrive at the yield measurement container 230 and the taste measurement container 240, and the travel speed of the combine at that time. Using the thus-calculated delay time, a data set including the yield and taste can be accurately assigned to each harvesting position.

Third Embodiment

A third embodiment will be described below with reference to FIGS. 14 to 24. In the above-described first embodiment, the yield measurement container 30 is provided to calculate the yield per unit of travel. In contrast, in the third embodiment, the yield measurement container is not provided. Instead, a configuration is employed in which the yield per unit of travel is calculated based on a detection signal from a load detector 341. The third embodiment is similar to the above-described first embodiment, except for the content described below. Note that, in the following description, constituent elements assigned the same signs as those of the constituent elements in the first embodiment are similar to those in the first embodiment, and detailed descriptions thereof will be omitted.

Figure 14:
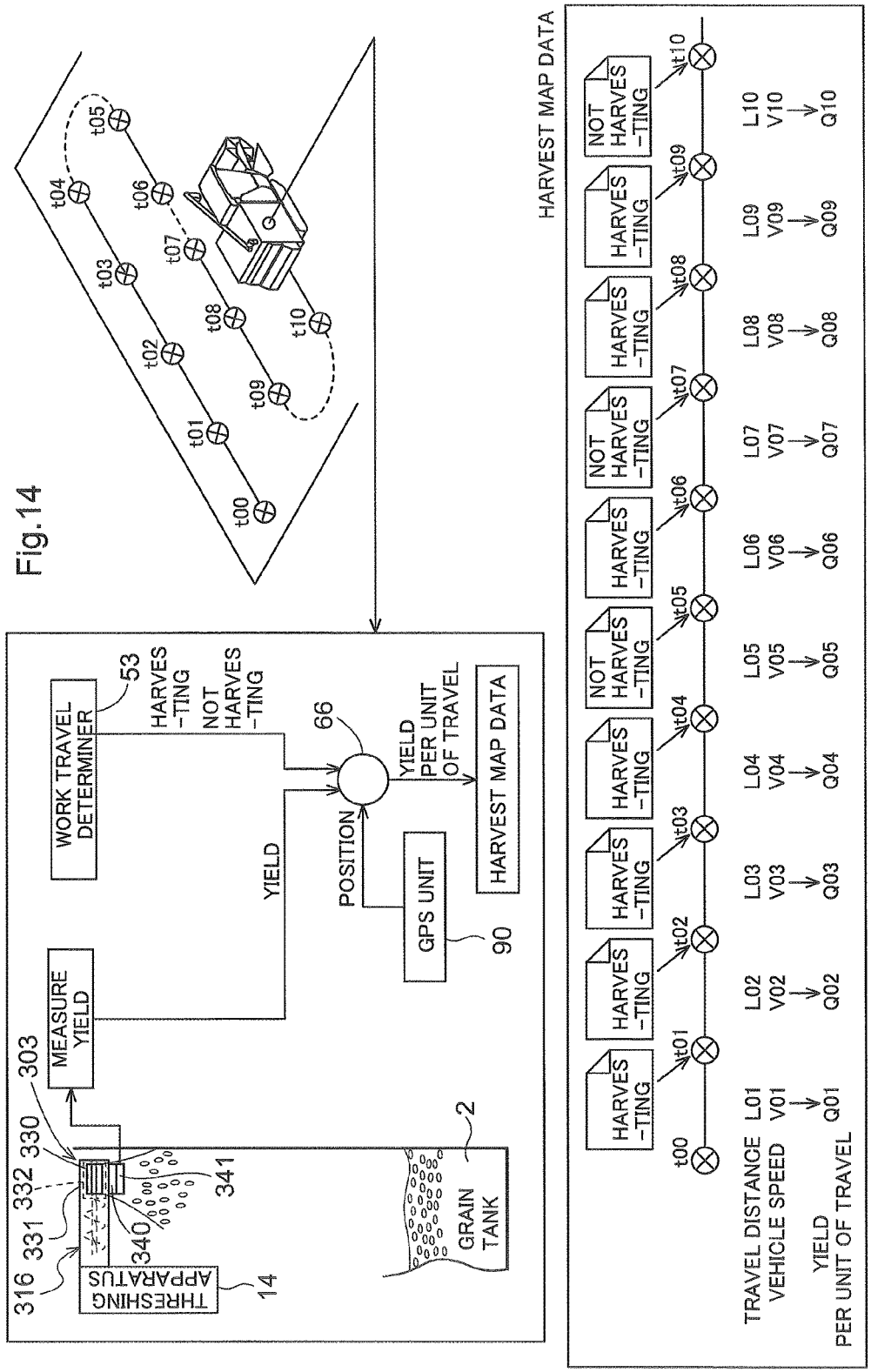
FIG. 14 is a schematic diagram showing a third embodiment (which also applies to FIGS. 15 to 24) and depicting a basic configuration of the third embodiment.

Before describing a specific configuration of a combine, which serves as the third embodiment of the present invention, a basic principle thereof will be described using FIG. 14. In the example in FIG. 14, the combine reaps culms of wheat, rice, or the like while traveling in a field, and threshed grains are stored in a grain tank 2, which is mounted in the combine. At this time, in this combine, the amount of grain supplied to the grain tank 2 over time, i.e. the yield, is measured. This combine includes a work travel determiner 53, which determines non-harvest work travel that does not involve grain harvesting, and harvest work travel that involves grain harvesting, based on the operation status of the reaper 12 and the like.

To measure the grain yield, this combine includes a grain conveyance mechanism 316 for conveying grains to the grain tank 2, a grain discharge apparatus 303 that is provided in a terminal area of the grain conveyance mechanism 316, the grain discharge apparatus 303 having a discharge case 331 provided with a grain discharge opening 330, as well as a discharge rotor 332 arranged within the discharge case 331 in a rotatable manner, a pressed portion 340 that receives pressing force from grains immediately before being discharged by the discharge rotor 332, and the load detector 341 for detecting the pressing force applied to the pressed portion 340. The yield of grain per unit of time is derived based on a detection signal of the load detector 341. The travel speed (which is indicated with a prefix V in FIG. 14) at this time point (which is indicated with a prefix t in FIG. 14) is simultaneously acquired. Note that the travel speed (hereinafter referred to as a vehicle speed) acquired here preferably is an average vehicle speed during the measurement time. The yield per unit of travel distance (yield per unit of travel) is calculated based on the yield of grain per unit of time and the vehicle speed. Furthermore, if, while the yield was being measured, the work travel determiner 53 has determined that there was non-harvest work travel, this yield per unit of travel is given a tag that indicates non-harvest work travel. If, while the yield was being measured, it has not at all been determined that there was non-harvest work travel, it is assumed that harvest work travel has been carried out, and this yield per unit of travel is given a tag that indicates harvest work travel. Furthermore, this yield per unit of travel is also associated with azimuth information (harvesting position information) obtained from an inertial navigator, a GPS unit 90, or the like. Note that the vehicle speed does not necessarily need to be acquired. For example, the time elapsed during travel over a given distance may be measured, and the yield per unit of travel may be calculated based on this time and the yield of grain per unit of time.

The yield per unit of travel that is thus sequentially calculated is recorded as harvest map data by the harvest map data generator 66. FIG. 14 schematically shows the yield per unit of travel (which is indicated with a prefix Q in FIG. 14) that is recorded as the harvest map data.

Figure 15:
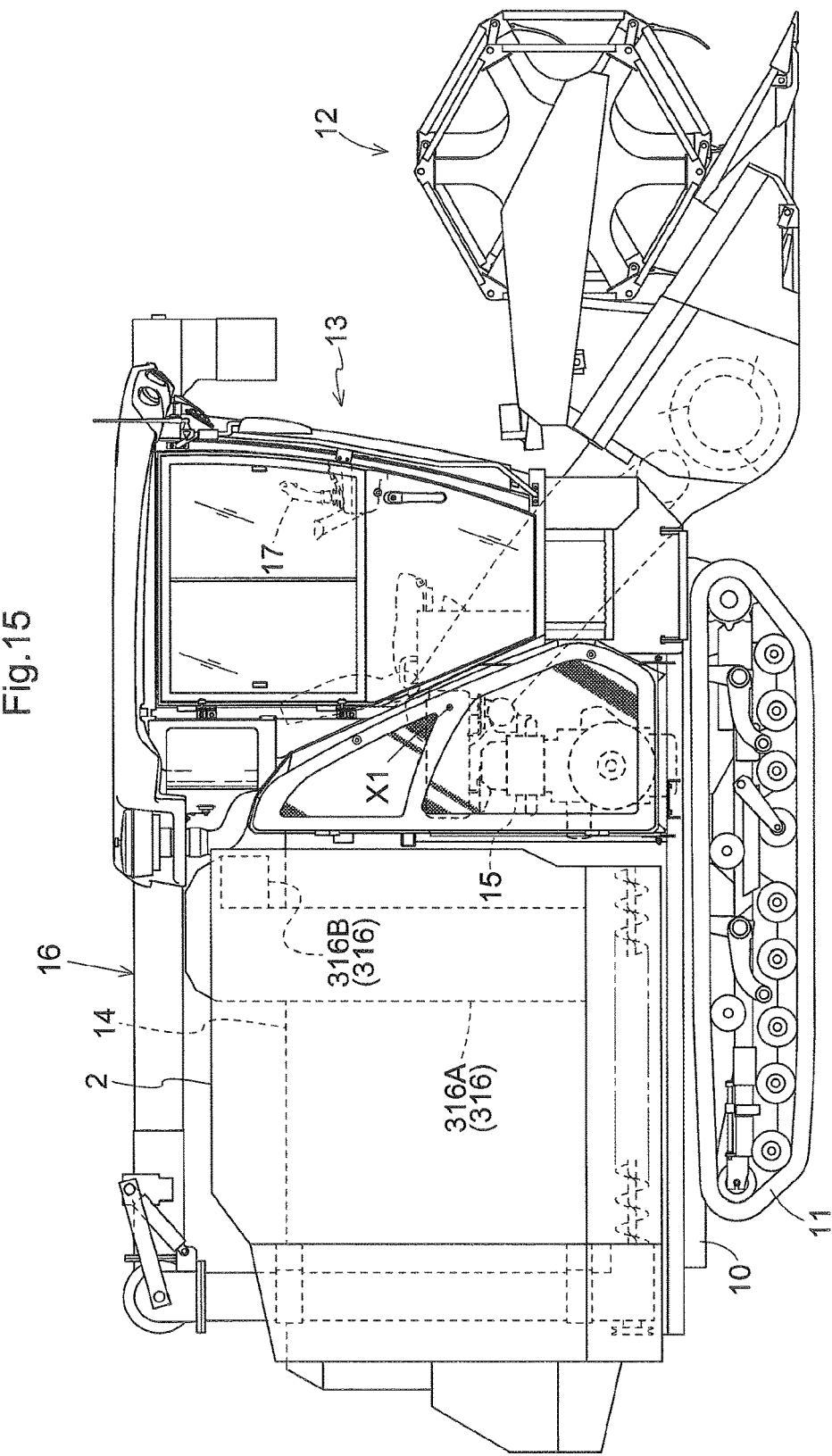
FIG. 15 is a right side view of the combine.
Figure 16:
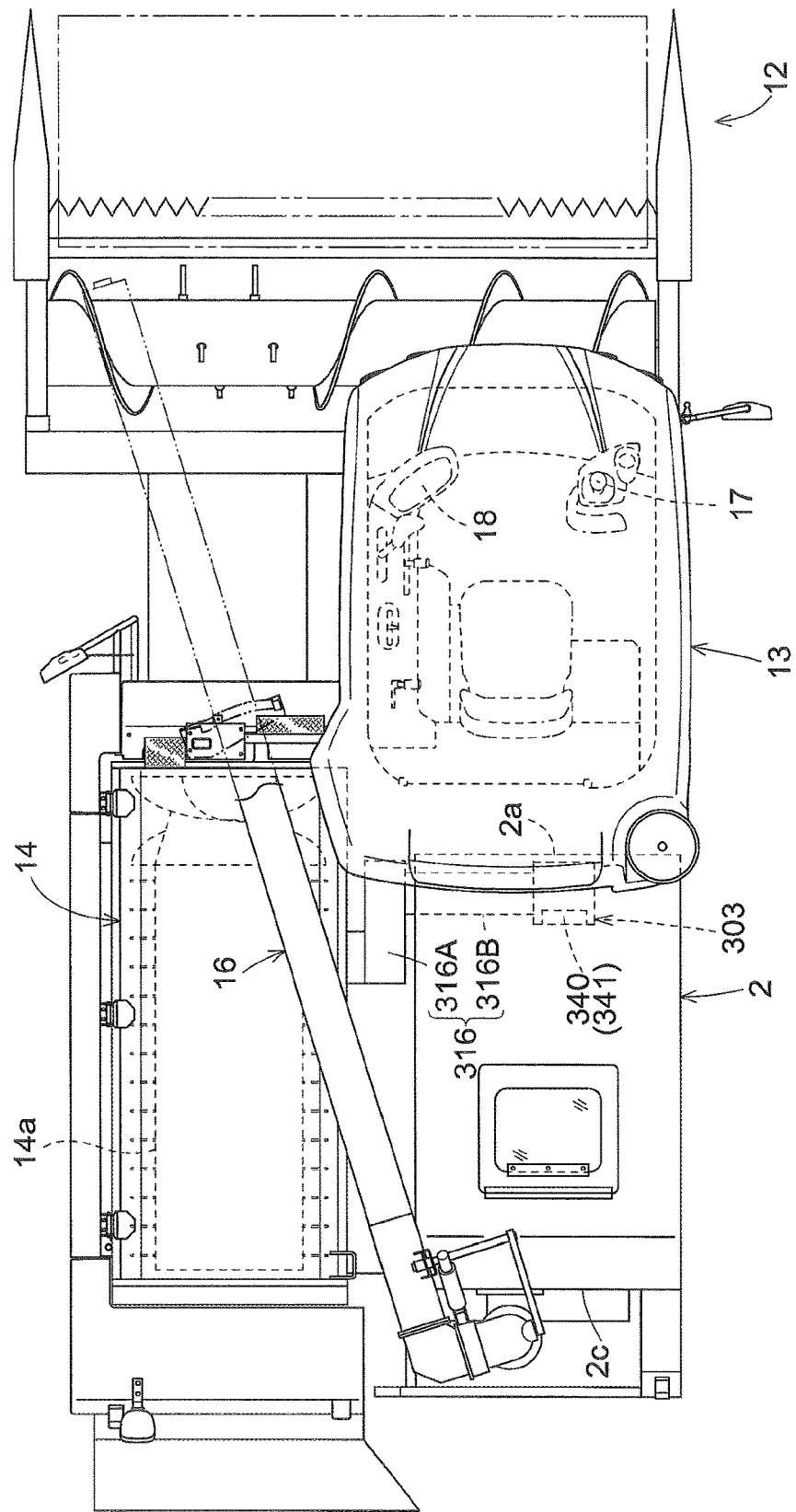
FIG. 16 is a plan view of the combine.

Next, a specific embodiment of the combine according to the present invention will be described using the drawings. FIG. 15 is a side view of a normal combine, which is an example of the combine. FIG. 16 is a plan view thereof. This combine includes a body frame 10 that is formed by connecting a plurality of steel materials such as a groove-shaped material and a square pipe material. A pair of left and right crawler traveling apparatuses 11 are attached to the lower portion of the body frame 10. The engine 15 is mounted on the front side in a right half portion of the body frame 10, and the cabin-like driving section 13 is formed thereabove.

The steering lever 17, the monitor 18, and the like are arranged in the driving section 13. The reaper 12 is attached to the front portion of the body frame 10 so as to be able to be raised and lowered. The threshing apparatus 14 for threshing reaped culms that are supplied from the reaper 12 and thrown, in a whole-culm state, into the threshing apparatus 14, the grain tank 2 for accumulating grains supplied from the threshing apparatus 14 by a grain conveyance mechanism 316, and an unloader 16 for discharging the grains accumulated in the grain tank 2 to the outside are attached to the rear portion of the body frame 10.

The reaper 12 is configured to be able to be raised and lowered around a first horizontal axis X1, which extends horizontally relative to the body. The reaper 12 enters a raised state during non-harvest work, such as when turning around, and enters a lowered state to come close to a field surface during harvest work. Culms reaped by the reaper 12 are conveyed to the front end of the threshing apparatus 14.

The threshing apparatus 14 is configured to thresh reaped culms conveyed from the reaper 12, using a cylinder 14a that is driven to rotate. The grain tank 2 is arranged in a rear right part above the body frame 10, and is located on the rear side of the driving section 13, adjacent to the threshing apparatus 14 on the right side. The grain conveyance mechanism 316 for conveying grains from the threshing apparatus 14 to the grain tank 2 is arranged between the threshing apparatus 14 and the grain tank 2.

Figure 17:
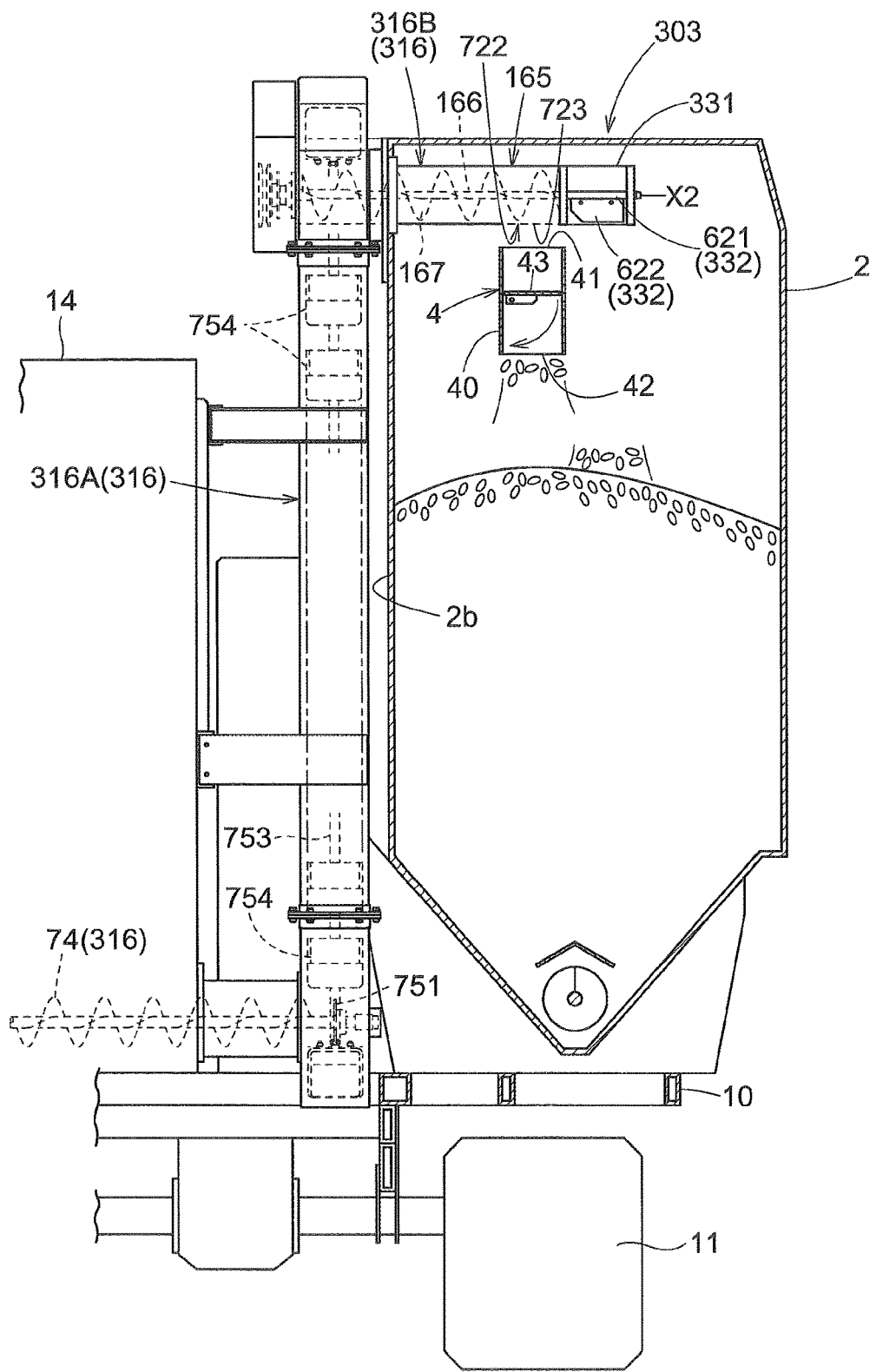
FIG. 17 is a diagram illustrating the combine viewed from the back and showing a grain conveyance mechanism and a grain tank.
Figure 18:
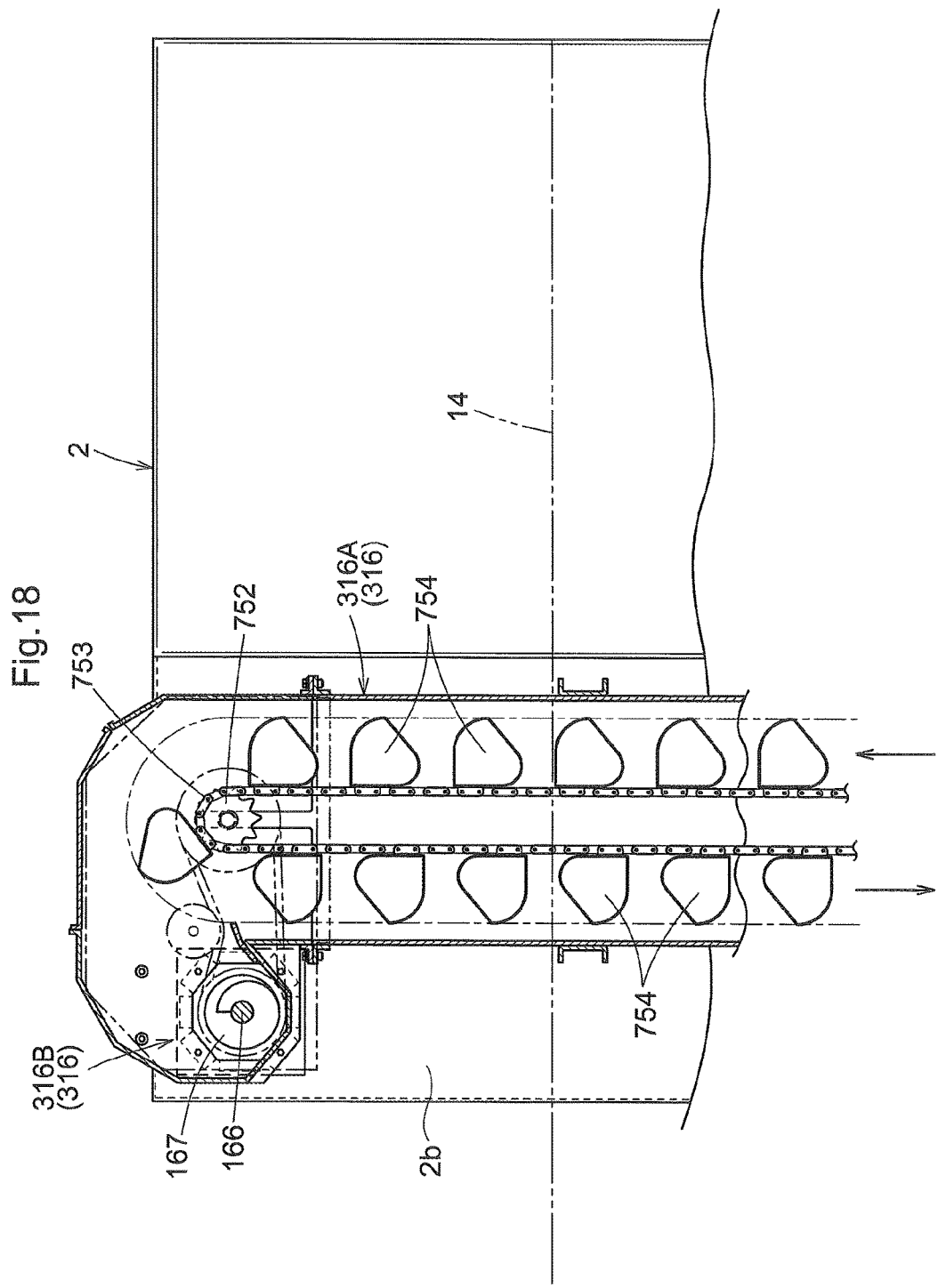
FIG. 18 is a diagram illustrating the combine viewed from the left side and showing the grain conveyance mechanism and the grain tank.

As shown in FIGS. 17 and 18, the grain conveyance mechanism 316 includes a clean grain collection screw 74, which is provided at the bottom of the threshing apparatus 14, a lift conveyor 316A, and a horizontal feed conveyor 316B. The lift conveyor 316A is substantially vertically erected in order to upwardly feed grains discharged from the threshing apparatus 14. The lift conveyor 316A is a bucket conveyer in which a plurality of buckets 754 are attached at even intervals to the outer circumferential side of the endless rotary chain 753, which is wound around the driving sprocket 751 and the driven sprocket 752.

The lift conveyor 316A is a bucket conveyer for upwardly feeding grains discharged from the threshing apparatus 14. The horizontal feed conveyor 316B is a screw conveyer that is connected to a conveyance terminal of the lift conveyor 316A and feeds, into the grain tank 2, the grains transferred from the lift conveyor 316A. The horizontal feed conveyor 316B horizontally extends from the upper end of the lift conveyor 316A, and is inserted in the upper front portion of a left side wall 2b of the grain tank 2. The outer circumferential portion of the horizontal feed conveyer 316B is surrounded by a casing 165 having a circular (or octagonal, or any other polygonal) cross-sectional shape. The horizontal feed conveyor 316B includes a screw shaft 166 and a screw body 167, which is fixed to this screw shaft 166.

The grain discharge apparatus 303 for discharging grains in a dispersing manner within the grain tank 2 is provided in a terminal area of the horizontal feed conveyor 316B. The grain discharge apparatus 303 includes the discharge rotor 332, and the discharge case 331, which surrounds the periphery of the discharge rotor 332. The discharge rotor 332 is a rotary blade constituted by a rotary shaft 621, which extends from the screw shaft 166, and a blade 622 provided on the rotary shaft 621. The blade 622 is fixed to the rotary shaft 621 so as to project in a radially outward direction from the rotary shaft 621. The blade 622 has a substantially flat pressing face for pressing out grains in its rotational direction. The discharge case 331 has a cylindrical shape having an inner diameter that is slightly larger than the rotation trajectory of the blade 622. Part of a circumferential face of the discharge case 331 is cut out. This cutout forms the grain discharge opening 330 for discharging grains to the rear side in the grain tank 2, using the rotation of the blade 622 (see FIG. 19).

The screw shaft 166 and the rotary shaft 621 integrally rotate around a horizontal axis X2. In this embodiment, the direction of this rotation is set as leftward rotation relative to the line of sight from a base end side toward a leading end side of the screw shaft 166 along the horizontal axis X2. That is to say, the blade 622 rotates counterclockwise in FIG. 19.

In this embodiment, the rotation trajectory radius of the blade 622 and the rotation trajectory radius of the screw body 167 are substantially the same. For this reason, the discharge case 331 is a cylindrical tubular body, and is formed as an extension of the casing 165 of the horizontal feed conveyor 316B. Note that, if the rotation trajectory radius of the blade 622 is larger than the rotation trajectory radius of the screw body 167, the discharge case 331 is formed to have a larger diameter than that of the casing 165 of the horizontal feed conveyor 316B. In the opposite case, the discharge case 331 is formed to have a smaller diameter than that of the casing 165 of the horizontal feed conveyor 316B.

Note that, in this embodiment as well, the taste measurement apparatus 4 and the second opening 722 are provided, similar to the first embodiment. As shown in FIG. 17, the taste measurement container 40 of the taste measurement apparatus 4 is arranged within the grain tank 2. The taste measurement apparatus 4 measures grain components such as moisture and protein through spectrometry performed on grains that are temporarily accumulated in the taste measurement container 40. The taste measurement container 40 is a tubular container. The second receiving opening 41 for receiving grains is formed at the upper end of the taste measurement container 40. The second discharge opening 42 for discharging received grains is formed at the lower end of the taste measurement container 40. The second shutter 43 is provided between the second receiving opening 41 and the second discharge opening 42, the second shutter 43 being for temporarily accumulating grains received through the second receiving opening 41, and discharging, through the second discharge opening 42, a given amount of grain that has been accumulated. The second opening 722 is provided on the upstream side of the grain discharge apparatus 303 in the grain conveyance direction. The taste measurement apparatus 4 is arranged below the second opening 722. Thus, grains that have fallen from the second opening 722 enter the taste measurement container 40 through the second receiving opening 41. The wire net 723, which serves as a porous member, is stretched over the second opening 722. The wire net 723, whose pore size exerts a grain-discrimination effect, suppresses mixing of culms, leaves, or the like in the grains supplied to the taste measurement container 40. Note that, in this embodiment, elements that correspond to the first opening 721 and the yield measurement apparatus 3 in the first embodiment are not provided.

Figure 19:
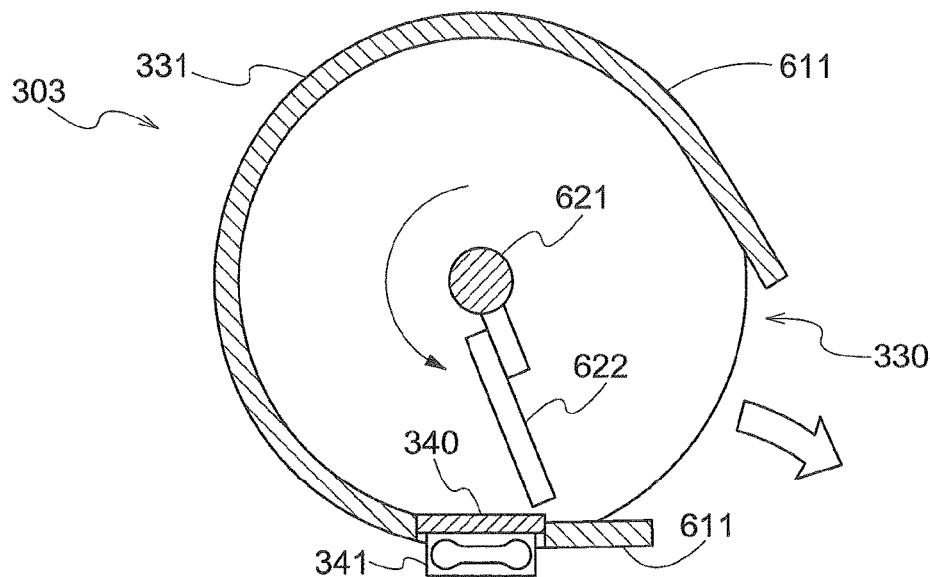
FIG. 19 is a vertical cross-sectional view of a grain discharge apparatus.
Figure 20:
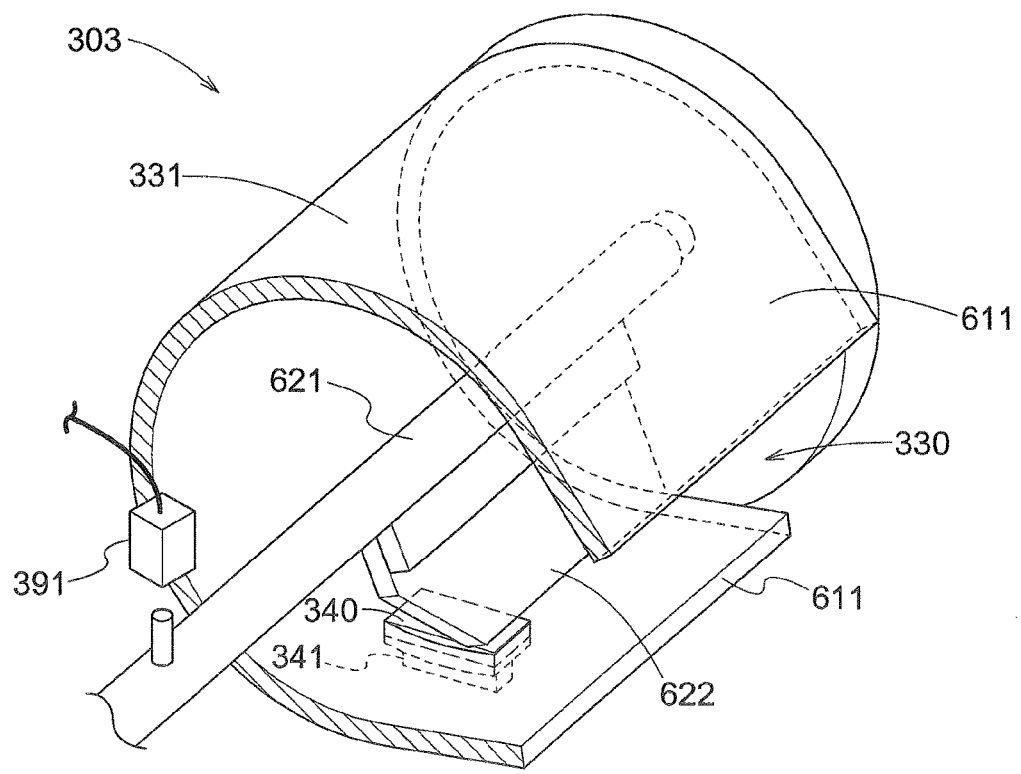
FIG. 20 is a perspective view of the grain discharge apparatus.

The grain discharge opening 330 is a cutout opening having substantially the same width as that of the blade 622 in the axial direction of the discharge case 331, and a length in the rotational direction that corresponds to one-fourth of the circumferential length of the discharge case 331 from the lower end thereof, as shown in FIGS. 19 and 20. Grains that are pushed and fed by the blade 622 are discharged from the discharge case 331 into the grain tank 2 through this grain discharge opening 330. To create a nozzle for defining the discharging direction of the grains discharged from the discharge case 331, discharge guide pieces 611 are formed at each edge of the grain discharge opening 330 in the circumferential direction, the discharge guide pieces 611 extending from the discharge case 331 in a tangent direction of the rotation trajectory of the blade 622.

As shown in FIG. 20, an opening that extends in the rotational direction of the blade 622 within the width of the blade 622 in the axial direction is provided in a circumferential wall portion of the discharge case 331 that is located before the grain discharge opening 330 in the rotational direction of the blade 622. The pressed portion 340, which is formed with a plate-shaped member, is attached in this opening. In this regard, a structure may be employed in which the pressed portion 340 is fitted into the opening so that a step is not formed between an inner face of the circumferential wall of the discharge case 331 and an inner face of the pressed portion 340. Furthermore, a load cell is provided as a load detector 341 for detecting a load applied to the pressed portion 340, in an outer face of the pressed portion 340. When grains are discharged by the blade 622, the pressure applied to the grains by the rotational force of the blade 622 is transmitted to the pressed portion 340 via the grains. The pressure due to this pressing causes distortion of the pressed portion 340. The pressure applied to the grains by the blade 622 increases with an increase in the amount of grain conveyed by the grain conveyance mechanism 316. Accordingly, an electrical signal generated in the load cell due to the distortion of the pressed portion 340 has an intensity that depends on the amount of conveyed grains (amount of harvested grain: yield). Accordingly, this electrical signal can be handled as a detection signal for evaluating a change in the conveyed grains and the amount thereof.

In this embodiment, the plate-shaped member constituting the pressed portion 340 functions as a portion of the circumferential wall of the discharge case 331, and also functions as a pressure-sensitive plate for detecting a change in the pressure due to an increase and decrease of the grains. For this reason, the load detector 341 for detecting a load applied to the pressed portion 340 may not only be a load cell, but also any other kind of pressure-sensitive sensor.

Furthermore, as shown in FIG. 20, a rotation angle sensor 391 for detecting the rotation cycle of the blade 622, i.e. the cycle of the rotary shaft 621 is arranged in the periphery of the rotary shaft 621. The rotation angle sensor 391 is a sensor for optically or magnetically detecting an object to be detected, such as a projection that is provided at a specific position in the circumferential direction of the rotary shaft 621. Based on a detection signal thereof, a pulse signal is generated that indicates a time point when the rotary shaft 621 passes through a specific point in the circumferential direction, or resultantly, a time point when the blade 622 passes therethrough.

Figure 21:
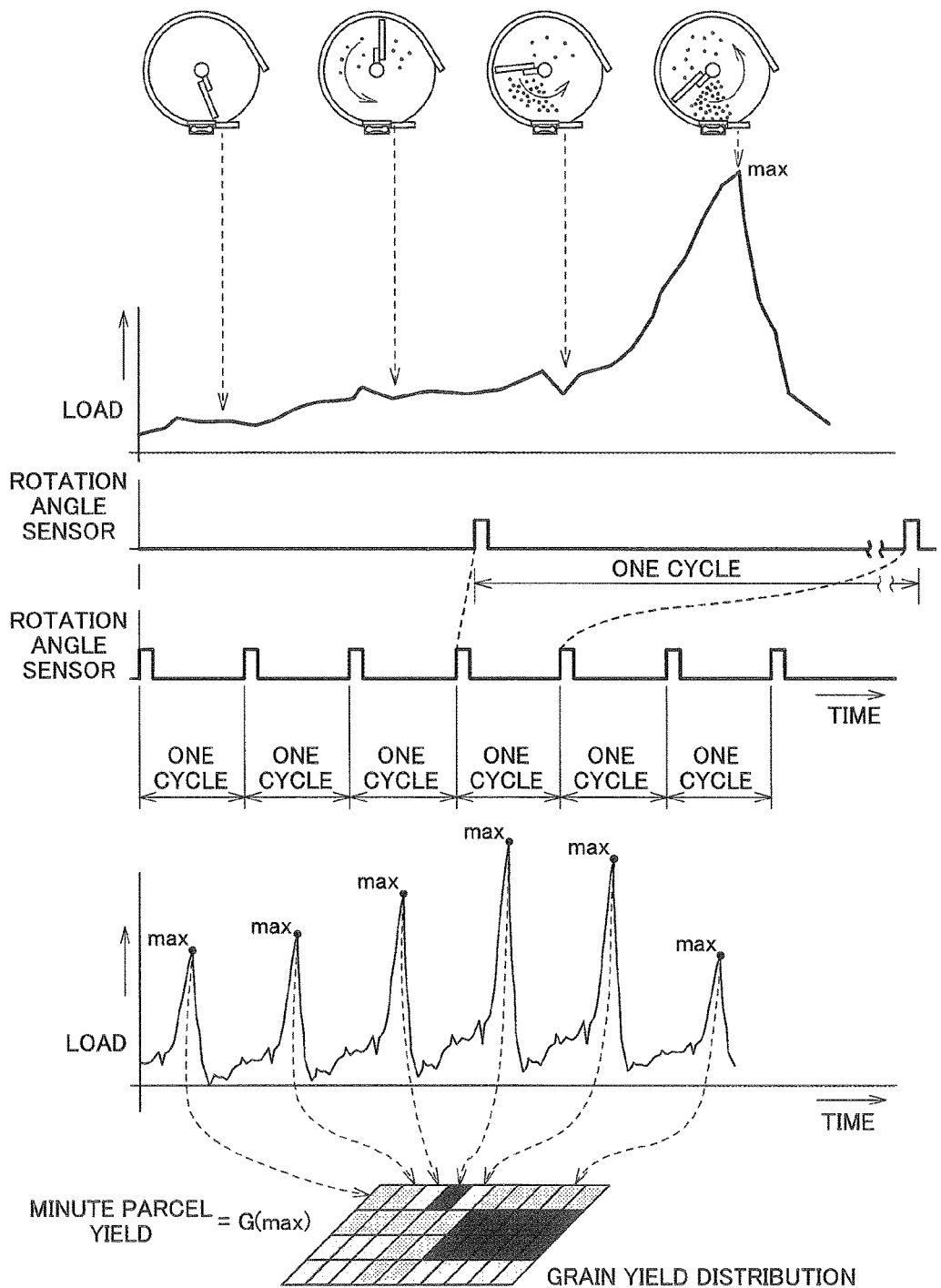
FIG. 21 is a diagram illustrating chronological behavior of a detection signal from a load detector at the time when grains are discharged.

FIG. 21 illustrates chronological behavior of a detection signal from the load detector 341 when grains are discharged. The upper graph in FIG. 21 schematically shows a detection signal (a voltage from the load cell) that is output by the load detector 341 within one rotation of the blade 622 (in one cycle). Immediately after the blade 622 has passed through the pressed portion 340, no large pressure (load) is applied to the pressed portion 340, and the level of the detection signal accordingly is low. Grains that are continuously fed from the horizontal feed conveyor 316B to the grain discharge apparatus 303 are pressed toward the grain discharge opening 330 by the rotating blade 622. When the blade 622 passes through the pressed portion 340, the force generated due to the pressing by the blade 622 is largest at the pressed portion 340. Accordingly, the detection signal of the load detector 341 at this time point is at its largest (max) in one cycle.

In FIG. 21, the blade 622 passes through the pressed portion 340 only once in a period (hereinafter also called a pulse zone) from when the pulse signal based on the detection signal from the rotation angle sensor 391 is generated until the next pulse signal is generated. A peak that is to be detected as the largest value (max) (a peak reached immediately before grains are discharged) occurs once in each pulse zone. Here, the timing at which the peak to be detected as the largest value (max) occurs while the blade 622 rotates once (hereinafter also called a peak timing) may be slightly shifted. For this reason, if the timing at which a pulse signal is generated and the timing at which the detection signal from the load detector 341 reaches the largest value (max) are set to be close to each other, a situation may occur, due to a shift in the peak timing, where no peak to be detected as the largest value (max) is included in one pulse zone, or where two or more peaks are included in one pulse zone. In view of this, in this embodiment, the blade 622 is configured to pass through the pressed portion 340 at a time point near the midpoint of the pulse zone to obtain the peak timing, as shown in FIG. 21. With this configuration, even if the peak timing is slightly shifted, a situation rarely occurs where no peak to be detected as the largest value (max) is included in one pulse zone, or where two or more peaks are included in one pulse zone.

The lower graph in FIG. 21 schematically shows the detection signal (voltage from the load cell) output by the load detector 341 while the blade 622 rotates a plurality of times (a plurality of cycles). A change in the largest value (max) in the respective cycles represents a change in the amount of grain fed by the horizontal feed conveyor 316B, i.e. a change in the amount of harvest (yield), in units of minute parcels of a field.

Accordingly, signal processing including filtering processing is performed on the detection signal from the load detector 341, and the yield per unit of travel distance can be derived using a preset yield derivation map 363, based on the largest value (max) calculated for each rotation (in each cycle) of the blade 622. The content of the yield derivation map 363 changes depending on the travel speed of the combine, the rotational speed of the blade 622, type of grain, or the like. In a simplest yield derivation map 363, the largest value (max) is linearly associated with the yield per unit of time (single rotation of the blade 622). Using this, the yield per unit of travel distance, i.e. the yield per unit of travel, is obtained based on the derived yield per unit of time and the travel speed of the combine. Note that the thus-obtained yield per unit of travel is also the yield per unit of distance of a field. Furthermore, the yield per unit of area (minute parcel) of a field is obtained based on the yield per unit of travel and the reaping width of the combine.

The culm reaping position (harvesting position) of the combine that is traveling for reaping in a field can be acquired using the GPS unit 90 or the like. By obtaining, in advance, the delay time taken until grains taken out from reaped culms through threshing processing are discharged from the grain discharge opening 330, and tracing the travel trajectory of the combine during this delay, the minute parcel of the field to which the aforementioned yield per unit of area (minute parcel) is to be assigned can be determined. Thus, ultimately, a grain yield distribution for an field can be generated.

Note that, in the case where the blade 622 rotates a plurality of times in a minute parcel (unit travel distance) of a field to which a yield is to be assigned, the largest value (max) obtained for each rotation (each cycle) is accumulated.

Figure 22:
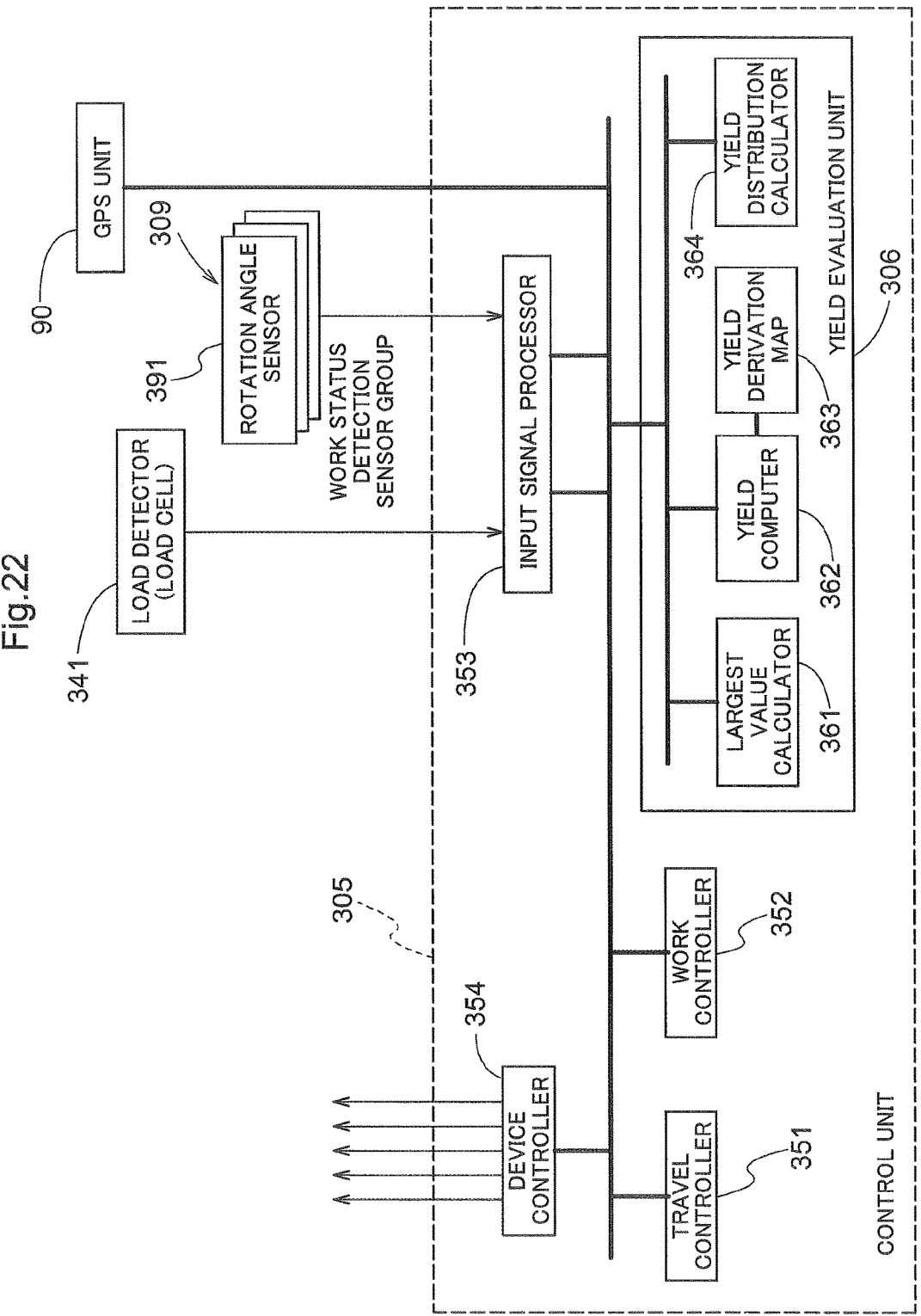
FIG. 22 is a functional block diagram showing functions of a control unit.
Figure 23:
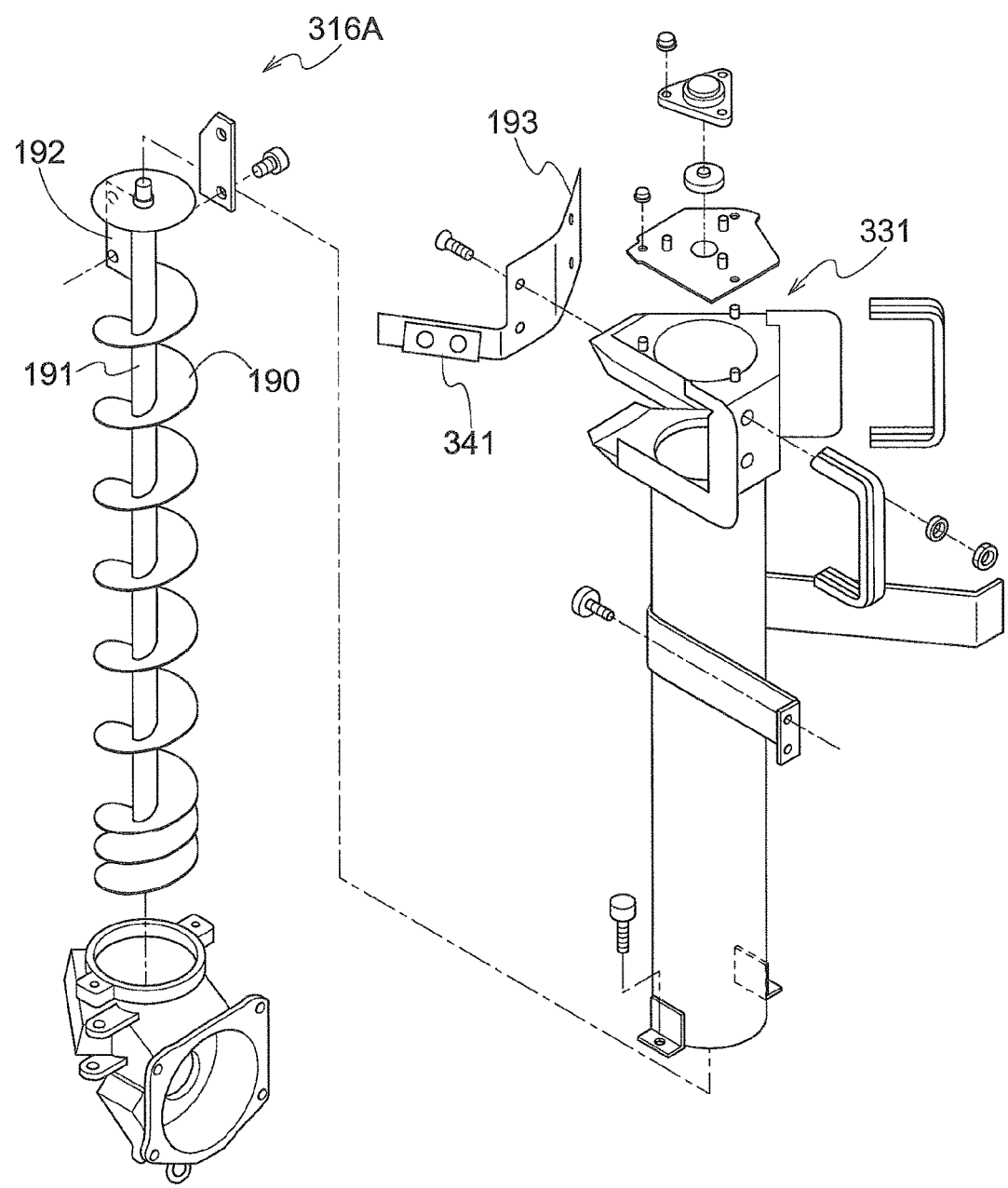
FIG. 23 is an exploded perspective view showing a modification of the grain discharge apparatus.
Figure 24:
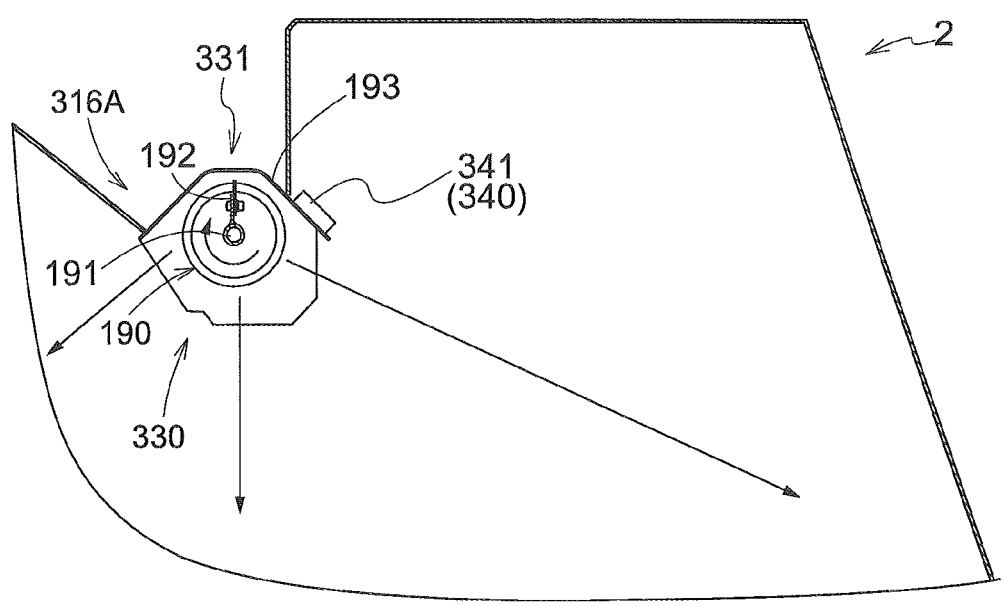
FIG. 24 is a plan view showing a modification of the grain discharge apparatus.

FIG. 22 shows some of the functional blocks in a control unit 305 of the combine. The control unit 305 includes a travel controller 351 for controlling devices related to travel, a work controller 352 for controlling devices related to the work apparatuses, and an input signal processor 353, which serve as modules for controlling operations of devices in the combine. Furthermore, in the control unit 305, a yield evaluator 306 is built as a functional module related to yield measurement. Control signals generated by the travel controller 351 and the work controller 352 are sent to various devices via a device controller 354. Signals from a manual operation device, signals from a work status detection sensor group 309, which include sensors, switches, or the like for detecting status of the devices constituting the combine, and detection signals from the load detector 341, which is a load cell, are input to the input signal processor 353. The input signal processor 353 converts these inputs into data in a required data format, and thereafter transfers this data to the functional units in the control unit 305. This combine includes the GPS unit 90 for detecting the vehicle position. The azimuth information acquired by the GPS unit 90 is also input to the control unit 305.

In this embodiment, the yield evaluator 306 includes a largest value calculator 361, a yield computer 362, the yield derivation map 363, and a yield distribution calculator 364. A detection signal from the load detector 341, which is a load cell, after being subjected to amplification processing and filtering processing by the input signal processor 353 is input to the largest value calculator 361. The largest value calculator 361 also receives, via the input signal processor 353, a signal from the rotation angle sensor 391 for detecting a rotation cycle of the blade 622 in the grain discharge apparatus 303, and calculates the largest value (max) in each cycle.

In this embodiment, one blade 622 is provided on the rotary shaft 621. One pulse is generated every time the rotary shaft 621 makes a rotation, based on the detection signal from the rotation angle sensor 391. That is to say, one largest value (max) is calculated every 360° rotation cycle. It is possible to calculate, in advance, a relationship between the time point when this pulse is generated and the time point when the largest value (max) is generated. Accordingly, it is possible to set a largest value generation area with a given temporal width as a gate, and set this largest value generation area as an evaluation area for calculating the largest value (max).

The yield derivation map 363 is a lookup table for deriving the amount of grain fed by the horizontal feed conveyor 316B per unit of time, with the largest value (max) in one cycle of the blade 622 as input. If the rotational speed of the blade 622 is selectable, lookup tables are prepared for respective rotational speeds, or the output value is corrected with a correction coefficient, which is set in accordance with the rotational speed. The yield computer 362 obtains the amount of grain (yield) per unit of time using the yield derivation map 363, based on the largest value (max) calculated by the largest value calculator 361. The yield computer 362 can also acquire the vehicle speed and the reaping width of the combine and obtain the amount of grain (yield) per unit of travel distance and per unit of area.

The yield computer 362 calculates a field position at which culms corresponding to grains subjected to the yield calculation were reaped, based on the position information from the GPS unit 90, and records, as grain yield status information, this position information in association with the obtained amount of grain (yield). The yield distribution calculator 364 assigns a yield to each minute parcel of the field and generates a grain yield distribution, based on the grain yield status information.

Note that, in the above description, the grain yield distribution is generated by associating the yield per unit of area with the position information. However, in this embodiment, harvest map data can also be generated that associates the yield per unit of travel, the position information, and the determination result obtained by the work travel determiner 53 with one another, similar to the first embodiment.

That is to say, signal processing including filtering processing is performed on the detection signal from the load detector 341, and the yield per unit of travel is derived based on the largest value (max) calculated for each rotation (one cycle) of the blade 622, and the yield derivation map 363. The position information acquired by the GPS unit 90 and the determination result obtained by the work travel determiner 53 are associated with this yield per unit of travel, and the harvest map data is generated by the harvest map data generator 66.

Furthermore, similar to the first embodiment, a yield distribution map that indicates a distribution of the yield per unit of travel in a field subjected to harvest work can be generated by matching the position information with a field map. Also, a yield distribution map that indicates a distribution of the yield per unit of travel and the taste value per unit of travel can be generated using the measured value obtained by the taste measurement apparatus 4 in addition to the aforementioned information. However, this configuration is also similar to that in the first embodiment, and a detailed description thereof will be omitted.

Modifications of Third Embodiment

Modifications of the above embodiment will be described below. The following modifications are similar to the above embodiment except for the content described below. The above embodiment and the following modifications may be combined as appropriate provided there is no inconsistency.

Note that the scope of the present invention is not limited to the above embodiment and the following modifications.

(1) In the above embodiment, the yield is dealt with as grain yield status information. However, alternatively, a change in the yield, i.e. data on a change in the largest value (max) may simply be used as the grain yield status information. In this case, the grain yield distribution is relative data that indicates whether the yield in units of minute parcels is large or small. An absolute value of the yield in a field can be obtained based on the result of measurement of the amount of grain performed when the grains are conveyed from the grain tank 2.

(2) In the above embodiment, the pressed portion 340 and the load detector 341 are provided in a portion of the discharge case 331 in the grain discharge apparatus 303 that is provided on the extension of the horizontal feed conveyor 316B. Since the mode of the grain discharge apparatus 303 is different depending on the type of combine, the present invention is not limited to the above embodiment in terms of the mode of the grain discharge apparatus 303, as well as the shape and arrangement of the pressed portion 340 and the load detector 341. For example, in FIGS. 23 and 24, the grain discharge apparatus 303 is provided at the upper end of the lift conveyor 316A of a screw conveyer type that conveys grains to the upper side of the grain tank 2 from the bottom of the threshing apparatus 14. The grain discharge apparatus 303 includes a blade 192, which is provided along the axial direction at the upper end of a shaft body 191 of a screw conveyer 190 that constitutes the lift conveyor 316A, and a blade cover 193 for covering this blade 192. The blade cover 193 is open along the rotation trajectory of the blade 192 in an area opposing a portion that faces the inside of the grain tank 2, and this opening serves as the grain discharge opening 330 for discharging grains. The blade 192 flings out grains conveyed by the screw conveyer 190, from the grain discharge opening 330 into the grain tank 2. The blade cover 193 has a shape that allows the grains, which have been flung out, to accumulate in the grain tank 2 in a horizontally distributed state in a close-as possible uniform manner. A plate-shaped pressed portion 340 and the load detector 341, which is constituted by a load cell, are attached to a portion in a side wall of the blade cover 193 where grains are held between the blade cover 193 and the blade 192 when the grains are discharged. Grains conveyed by the lift conveyor 316A are pressed against the side wall of the blade cover 193 by the blade 192. Accordingly, a load that corresponds to the amount of grain is applied to the pressed portion 340. The load detector 341 (load cell) detects this load applied to the side wall.

(3) In the above embodiment, one blade 622 is provided on the rotary shaft 621. However, a plurality of blades 622 may be provided on the rotary shaft 621. In this regard, it is favorable that the blades 622 are arranged at equal intervals in the circumferential direction. In this case, the interval between rotation phases in which the peak to be detected as the largest value (max) (peak immediately before grains are discharged) is generated is not 360 degrees but a value obtained by dividing 360 degrees by the number of blades 622. To detect each peak as the largest value (max), the rotation cycle of the rotary shaft 621 may be divided into the same number of zones (hereinafter referred to as divided zones) as the number of blades 622 at a ratio that corresponds to the allocating pitch of the blades 622 in the rotational direction of the rotary shaft 621. In this case, if the blades 622 are configured to pass through the pressed portion 340 at a time point near the midpoint of each divided zone to obtain a peak timing, even if the peak timing is shifted slightly, a situation rarely occurs where no peak to be detected as the largest value (max) is included in one divided zone, or where two or more peaks are included in one divided zone. Note that, to divide the rotation cycle of the rotary shaft 621, a plurality of specific points may be set corresponding to the respective blades 622. In this case, the rotation angle sensor 391 generates the same number of pulses as the number of blades 622 for each rotation of the rotary shaft 621. Thus, the rotation cycle of the rotary shaft 621 is divided into the same number of pulse zones as the number of blades 622.

(4) In the above embodiment, the shape of the blade 622 is a flat plate. However, various shapes, such as a curved body, may be employed.

INDUSTRIAL APPLICABILITY

The present invention is applicable to various combines that include a grain tank for containing grains obtained by threshing culms reaped in a field while the combines travel.

DESCRIPTION OF REFERENCE SIGNS

First Embodiment
2: Grain tank
12: Reaper
12a: Reaping clutch
14: Threshing apparatus
18: Monitor
30: Yield measurement container
31: First receiving opening
32: First discharge opening
33: First shutter
40: Taste measurement container
41: Second receiving opening
42: Second discharge opening
43: Second shutter
53: Work travel determiner
61: First shutter controller
63: Yield calculator
64: Second shutter controller
65: Taste calculator
66: Harvest map data generator
67: Harvest information recorder
68: Yield distribution map generator
71: Screw conveyer
73: Impeller
100: Management server
721: First opening
722: Second opening
731: Rotary shaft
Second Embodiment
202: Grain tank
214: Threshing apparatus
230: Yield measurement container
231: First receiving opening
232: First discharge opening
233: First shutter
240: Taste measurement container
241: Second receiving opening
242: Second discharge opening
243: Second shutter
921: First opening
922: Second opening
Third Embodiment
2: Grain tank
12: Reaper 14: Threshing apparatus
316: Grain conveyance mechanism
303: Grain discharge apparatus
330: Grain discharge opening
331: Discharge case
332: Discharge rotor
332: Discharge rotor
340: Pressed portion
341: Load detector

The invention claimed is:

1. A combine for reaping culms in a field while traveling, and accumulating, in a grain tank, grains obtained by threshing reaped culms, comprising:
   a yield calculator for calculating a yield per unit of travel, which is a yield per unit of travel distance;
   a work travel determiner for determining non-harvest work travel that does not involve grain harvesting, and harvest work travel that involves grain harvesting;
   a harvest map data generator for generating harvest map data in which the yield per unit of travel, a travel route traveled in the field, and a result of determination performed by the work travel determiner are associated with one another; and
   a harvest information recorder for recording the harvest map data.

2. The combine according to claim 1, further comprising:
   a monitor for displaying a yield distribution map indicating a distribution of the yield per unit of travel distance in a field subjected to work, the yield distribution map being generated based on the harvest map data.

3. The combine according to claim 2,
   wherein, in the yield distribution map, a travel route during the non-harvest work travel is displayed in a distinguishable manner.

4. The combine according to claim 2, further comprising:
   a transmitter for transmitting the harvest map data to an external management server via a communication line; and
   a receiver for receiving the yield distribution map generated by the management server based on the harvest map data.

5. The combine according to claim 2, further comprising:
   a yield distribution map generator for generating the yield distribution map based on the harvest map data.

6. The combine according to claim 1,
   wherein the yield calculator calculates the yield per unit of travel based on vehicle speed and an accumulation time required for a given volume of grain to accumulate.

7. The combine according to claim 1, further comprising:
   a yield measurement container for temporarily accumulating at least some of the grains supplied to the grain tank,
   wherein the yield calculator calculates the yield per unit of travel based on a state of grains accumulated in the yield measurement container.

8. The combine according to claim 1, further comprising:
   a grain conveyance mechanism for conveying grains obtained by threshing reaped culms to the grain tank;
   a grain discharge apparatus provided in a terminal area of the grain conveyance mechanism, the grain discharge apparatus having a discharge case provided with a grain discharge opening, and a discharge rotor that is rotatably arranged in the discharge case;
   a pressed portion for receiving pressing force applied by grains immediately before being discharged by the discharge rotor; and
   a load detector for detecting the pressing force applied to the pressed portion,
   wherein the yield calculator calculates the yield per unit of travel based on a detection signal from the load detector.

9. The combine according to claim 8,
   wherein a plate-shaped member serving as the pressed portion is attached at a position immediately before the grain discharge opening in a grain conveyance direction in the discharge case, and
   the pressing force applied by grains passing between the discharge rotor and the plate-shaped member is exerted on the plate-shaped member.

10. The combine according to claim 9,
    wherein the plate-shaped member is formed as a pressure-sensitive plate extending in a rotational direction of the discharge rotor, and the load detector is a load cell attached to the pressure-sensitive plate.

11. The combine according to claim 8,
    wherein the discharge case is a tubular body having a cylindrical portion centered around a rotation axis of the discharge rotor and extending along the rotation axis,
    the grain discharge opening is provided in a portion of an inner-circumferential face of the tubular body, and
    the pressed portion is provided in a circumferential face portion of the inner-circumferential face, the circumferential face portion being located before the grain discharge opening in a rotational direction of the discharge rotor.

12. The combine according to claim 1,
    wherein the work travel determiner determines the non-harvest work travel and the harvest work travel based on a height of a reaper for reaping culms in a field from the ground.

13. The combine according to claim 1,
    wherein the work travel determiner determines the non-harvest work travel and the harvest work travel based on switch-off information regarding a reaping clutch for switching on and off power transmission to a reaper for reaping culms in a field.

14. The combine according to claim 1, further comprising:
    a taste measurement container for temporarily accumulating at least some of the grains supplied to the grain tank;
    a taste measurer for outputting a measured value related to a taste of the grains accumulated in the taste measurement container; and
    a taste calculator for calculating a taste value per unit of travel distance based on the measured value,
    wherein the harvest map data generator incorporates the taste value into the harvest map data.

15. A combine for reaping culms in a field while traveling, and accumulating, in a grain tank, grains obtained by threshing reaped culms, comprising:
    a yield measurement container having a first receiving opening for receiving at least some of the grains supplied to the grain tank, a first discharge opening for discharging received grains, and a first shutter for opening and closing the first discharge opening to enable grains received through the first receiving opening to temporarily accumulate;
    a yield calculator for calculating a yield per unit of travel, which is a yield per unit of travel distance, based on a state of grains accumulated in the yield measurement container;

a taste measurement container having a second receiving opening for receiving at least some of the grains supplied to the grain tank, a second discharge opening for discharging received grains, and a second shutter for opening and closing the second discharge opening to enable grains received through the second receiving opening to temporarily accumulate; and a taste calculator for measuring a taste value of grains temporarily accumulated in the taste measurement container, and calculating a taste value per unit of travel, which is a taste value of grains harvested per unit of travel distance.

16. The combine according to claim 15, wherein a first opening and a second opening are formed in an intra-grain-tank pipe portion of a supply pipe for supplying grains from a threshing apparatus to the grain tank, the first opening and the second opening being open spaced apart in a grain supply direction, the first opening is the first receiving opening, and the second opening is the second receiving opening.

17. The combine according to claim 16, wherein the first opening is formed at a position closer in the grain supply direction to the threshing apparatus than the second opening.

18. The combine according to claim 17, wherein a screw conveyer for supplying grains is provided in the intra-grain-tank pipe portion, and the screw conveyer is provided to extend up to the first opening from the threshing apparatus side.

19. The combine according to claim 16, wherein the second opening is covered with a porous member for discriminating between unhulled rice grains and straw.

20. The combine according to claim 19, wherein an impeller is provided in a portion that corresponds to the second opening in the intra-grain-tank pipe portion, the impeller being configured to rotate around a rotary axis along a direction in which the supply pipe extends, and unhulled rice grains are pressed by the impeller into the taste measurement container through the porous member.

21. The combine according to claim 15, wherein the yield calculator calculates the yield per unit of travel based on vehicle speed and an accumulation time required for a given volume of grain to accumulate in the yield measurement container.

22. The combine according to claim 15, further comprising:

a harvest map data generator for combining the yield per unit of travel and the taste value per unit of travel with a travel route traveled in a field to generate harvest map data; and a harvest information recorder for recording the harvest map data.

23. The combine according to claim 22, further comprising:

a monitor for displaying a yield distribution map indicating a distribution of the yield per unit of travel distance in a field subjected to work, the yield distribution map being generated based on the harvest map data.

24. The combine according to claim 23, further comprising:

a transmitter for transmitting the harvest map data to an external management server via a communication line; and a receiver for receiving the yield distribution map generated by the management server based on the harvest map data.

25. The combine according to claim 23, further comprising:

a yield distribution map generator for generating the yield distribution map based on the harvest map data.

26. The combine according to claim 15, wherein the yield measurement container and the taste measurement container are arranged in the same wall face of the grain tank.

27. A grain evaluation control apparatus for a combine for reaping culms in a field while traveling, and accumulating, in a grain tank, grains obtained by threshing reaped culms, the grain evaluation control apparatus comprising:

a first shutter controller for controlling opening and closing of a first shutter for temporarily accumulating some of the grains supplied to the grain tank;

a second shutter controller for controlling opening and closing of a second shutter for temporarily accumulating grains supplied to the grain tank other than the grains accumulated by the first shutter, independently of the control of the first shutter;

a yield calculator for calculating a yield per unit of travel, which is a yield per unit of travel distance, based on a state of the grains temporarily accumulated by the first shutter; and a taste calculator for measuring a taste value of the grains temporarily accumulated by the second shutter, and calculating a taste value per unit of travel, which is a taste value of grains harvested per unit of travel distance.

28. The grain evaluation control apparatus according to claim 27, further comprising:

a harvest map data generator for combining the yield per unit of travel and the taste value per unit of travel with a travel route traveled in a field to generate harvest map data.

* * * * *